United States Patent
McCarty, II et al.

(10) Patent No.: US 11,441,985 B2
(45) Date of Patent: Sep. 13, 2022

(54) SYSTEM FOR ANALYZING IMPACT AND PUNCTURE RESISTANCE

(71) Applicants: Dow Global Technologies LLC, Midland, MI (US); Rohm and Haas Company, Collegeville, PA (US)

(72) Inventors: Donald L. McCarty, II, Midland, MI (US); Erick Sutanto, Collegeville, PA (US); John Lund, Midland, MI (US); Brayden E. Glad, Lake Jackson, TX (US); Hitendra Singh, Lake Jackson, TX (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 117 days.

(21) Appl. No.: 16/630,740

(22) PCT Filed: Apr. 30, 2018

(86) PCT No.: PCT/US2018/030298
§ 371 (c)(1),
(2) Date: Jan. 13, 2020

(87) PCT Pub. No.: WO2019/027522
PCT Pub. Date: Feb. 7, 2019

(65) Prior Publication Data
US 2021/0131933 A1     May 6, 2021

Related U.S. Application Data

(60) Provisional application No. 62/539,381, filed on Jul. 31, 2017.

(51) Int. Cl.
*G01N 3/42*     (2006.01)

(52) U.S. Cl.
CPC ....... *G01N 3/42* (2013.01); *G01N 2203/0067* (2013.01); *G01N 2203/0282* (2013.01); *G01N 2203/0494* (2013.01)

(58) Field of Classification Search
CPC .......... G01N 1/312; G01N 35/10; G01N 3/42; G01N 2203/0067; G01N 2203/0282; G01N 2203/0494
(Continued)

(56) References Cited

U.S. PATENT DOCUMENTS

| | | | |
|---|---|---|---|
| 4,537,060 A | 8/1985 | Underwood | |
| 5,363,885 A * | 11/1994 | McConnell | G01N 33/02 73/864.81 |

(Continued)

FOREIGN PATENT DOCUMENTS

| | | |
|---|---|---|
| CN | 106053236 A | 10/2016 |
| JP | S64013434 A | 1/1989 |

(Continued)

OTHER PUBLICATIONS

Sormana et al., "High-throughput dynamic impact characterization of polymer films", Materials Research Innovations, 2003.
(Continued)

*Primary Examiner* — Octavia Davis Hollington
(74) *Attorney, Agent, or Firm* — Dinsmore & Shohl LLP

(57) ABSTRACT

A method and a system for analyzing a physical characteristic of a film sample are described herein. The system includes a material holder system configured to hold the film sample; a dart testing system configured to test a physical characteristic of the film sample; and a moving system configured to move the held film sample to be analyzed or tested between stations. The moving system is configured to move the held film sample in the material holder system to the dart testing system.

20 Claims, 17 Drawing Sheets

(58) Field of Classification Search
USPC .......................................................... 73/12.09
See application file for complete search history.

(56) References Cited

U.S. PATENT DOCUMENTS

| | | | |
|---|---|---|---|
| 7,997,118 B2* | 8/2011 | Mecca .................... | G01N 3/567 73/7 |
| 8,770,036 B2* | 7/2014 | Vodnick ................... | G01N 3/02 73/788 |
| 9,000,360 B2* | 4/2015 | DeWitte ................. | G01N 30/16 250/288 |
| 9,057,672 B2* | 6/2015 | McKeen .......... | G01N 35/00029 |
| 9,135,515 B2* | 9/2015 | Bean ..................... | G06T 7/0008 |
| 11,313,879 B2* | 4/2022 | McCarty, II ........... | G01Q 60/38 |
| 2006/0243057 A1 | 11/2006 | Bailey et al. | |
| 2013/0152706 A1 | 6/2013 | Nam et al. | |

FOREIGN PATENT DOCUMENTS

| | | |
|---|---|---|
| JP | H1-158330 A | 6/1989 |
| JP | H03142188 A | 6/1991 |
| JP | H7-34352 A | 2/1995 |
| JP | H8-226881 A | 9/1996 |
| JP | 2001188032 A | 7/2001 |
| JP | 2002286604 A | 10/2002 |
| JP | 2004175541 A | 6/2004 |
| JP | 2005148057 A | 6/2005 |
| JP | 2006526775 A | 11/2006 |
| JP | 2009271037 A | 11/2009 |
| WO | 2005054815 A1 | 6/2005 |
| WO | 2017011400 A1 | 1/2017 |

OTHER PUBLICATIONS

International Search Report and Written Opinion pertaining to PCT/US2018/030298, dated Aug. 7, 2018.
Examination Report dated Feb. 8, 2022, pertaining to EP Patent Application No. 18727486.5, 5 pgs.
Examination Report dated Mar. 29, 2022, pertaining to JP Patent Application No. 2020-503992, 8 pgs.
Korean Office Action dated Apr. 20, 2022, pertaining to KR Patent Application No. 10-2020-7005143, 3 pgs.

* cited by examiner

SYSTEM FOR ANALYZING IMPACT AND PUNCTURE RESISTANCE

FIELD

The present invention relates to a system and process for analyzing impact and puncture resistance of a film or sheet of material.

INTRODUCTION

Characterizing physical properties of materials is useful in analyzing and improving chemical formulations employed in the production of the materials as well as in analyzing and improving processes of manufacturing the materials. Characterizing the physical properties may also help consumers determine the best product for their particular use case, as well as help researchers develop novel solutions for specific applications. One of the useful physical properties of a material is determining puncture properties of the material. A dart test provides scientists insight into the high speed puncture properties of a material. A dart test usually involves piercing a thin film with a rounded cylindrical probe of specific dimensions that is traveling at a specific speed and measuring a force exerted by the probe on the thin film.

Currently, dart testing on films is performed in two ways: the manual drop-dart system and the instrumented dart system. In both cases the system relies on gravity to accelerate the dart probe towards the film to be tested. The film is held taut in place by means of clamping mechanisms. The drop dart (DD) involves dropping a known mass/weight onto the film. An operator makes an observation of whether the film was punctured. This test can be repeated numerous times with different masses/weights on multiple replicates of the film. The resulting film properties (usually only the overall energy) is estimated from the results. However, this system is cumbersome to use, not suited for automated operation, and does not provide a detailed understanding of the nature of a force curve applied to the film.

The instrumented dart impact system (IDI) is better suited to obtain richer data from a single test by incorporating a force sensor on the dart probe used to puncture the film. This is the current state-of-the-art for automated dart systems. However, even with this system, the loading and unloading of films is performed manually. In addition, this system provides a limited amount of collected data.

Therefore, a need remains for an automated process and system for analyzing impact and/or puncture resistance of a film of material.

SUMMARY

It was determined that by using a system and method for analyzing impact and/or puncture resistance according to the present disclosure, the process is automated, throughput is increased, and the amount of data gathered from testing is improved.

An aspect of the present disclosure is to provide a system for analyzing a physical characteristic of a film sample. The system includes a material holder system configured to hold the film sample; a dart testing system configured to test a physical characteristic of the film sample; and a moving system configured to move the held film sample to be analyzed or tested between stations. The moving system is configured to move the held film sample in the material holder system to the dart testing system.

Another aspect of the present disclosure is to provide a method for analyzing a physical characteristic of a film sample. The method includes holding the film sample by a material holder system connected to a moving system; moving the film sample by the moving system to a dart testing system; and testing a physical characteristic of the film of the material using the dart testing system.

BRIEF DESCRIPTION OF THE DRAWINGS

The present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION

Figure 1:
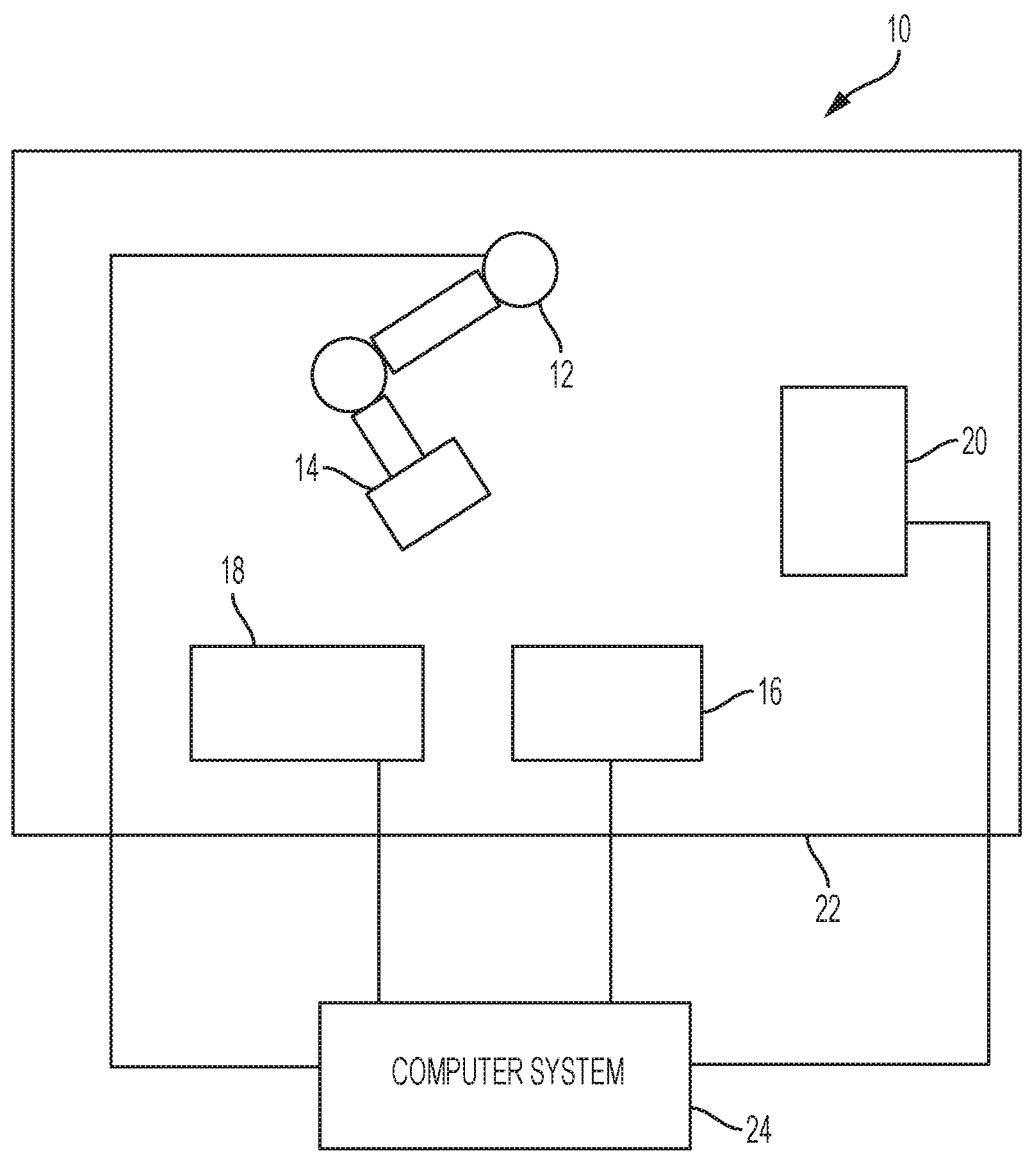
FIG. 1 shows a schematic diagram of a system according to an embodiment of the present disclosure.

According to embodiments of the disclosure, the process of testing impact and puncture resistance of a thin film of material may be automated. The idea for automated dart testing systems arises from a need for high throughput (HTP) testing in various industries. A higher rate of testing large amounts of materials and obtaining data that can be gathered relatively quickly and analyzed for trends, allows more detailed studies to be conducted on areas of interest. One feature needed in the inception of an HTP testing setup is a continuous (or near continuous) operation. By allowing systems to run non-stop, it increases the amount of testing performed. The system also allows increase of increasing the speed of a single test as compared to manual testing systems. This is accomplished using robotics to take the place of a human researcher or operator, as robots can run for longer periods of time without interruption. A second feature that may be used for increasing throughput of a system without sacrificing accuracy is to perform multiple tests in parallel. A third feature is that the system is repeatable and uniform as compared to human-based testing systems. Embodiments of the present disclosure employ these features to provide a testing setup that can greatly increase the number of samples tested.

In addition to being integrated with the blown film fabrication line, the present system for analyzing impact and puncture resistance of thin films can also be integrated into existing blown film labs. By being able to conduct tests automatically and relatively quickly, the labs would be able to clear out their backlog of tests using the present system.

Furthermore, the present system allows testing various films of material including testing polymeric films (e.g., plastics) and non-polymeric films. In addition, the present system can be used to test films or substrates of various thicknesses including substrates with a thickness of up to 1 mm or higher. The substrates can be, for example, polymeric plaques, metal sheets, paper sheets, or other composite materials. Therefore, the terms "film," "film sample," or "film of material" are used herein to encompass various types of materials (e.g., plastic, paper, metal, or composites) and various thicknesses of the materials. In one instance, the system allows the testing of other fabricated materials, such as those formed through injection molding, and other plastic-forming means.

As it can be appreciated from the following paragraphs, the system according to an embodiment of the present disclosure accomplishes a set of tasks in an efficient manner. The tasks include measuring a thickness of the film sample; visually analyzing the film for defects in a measurement region that would affect the analysis; measuring the film's strength and energy dissipation under impact; loading the film sample into a testing station, testing the film; and removing the tested film from the testing station. In an embodiment, the system allows measuring the thickness of a film at a position described by ASTM F1306; analyzing the film for defects in the dart impact measurement region using a camera and machine vision analysis techniques; loading the film into the testing station using a system that ensures separation of films for consistent loading; performing a dart impact analysis of the film sample; and performing automated calculation of results.

FIG. 1 shows a schematic diagram of a system according to an embodiment of the present disclosure. In an embodiment of the present disclosure, the system for analyzing impact and puncture resistance 10 includes one or more of a robotic system 12, a material holder system 14, a material thickness measurement system 16, a material image analyzer system 18, and a dart testing system 20. The robotic system 12, the material holder system 14, the material thickness measurement system 16, the material image analyzer system 18, and the dart testing system 20 can be located on a work surface 22 or common framework. The robotic system 12, the material holder system 14, the thickness measurement system 16, the material image analyzer system 18, and the dart testing system 20 can be controlled using computer system 24. A delivery system may also be provided. The delivery system may include one or more trays which deliver samples to a work surface where the robotic system 12 and material holder system 14 may retrieve the film sample from the one or more trays.

Figure 2:
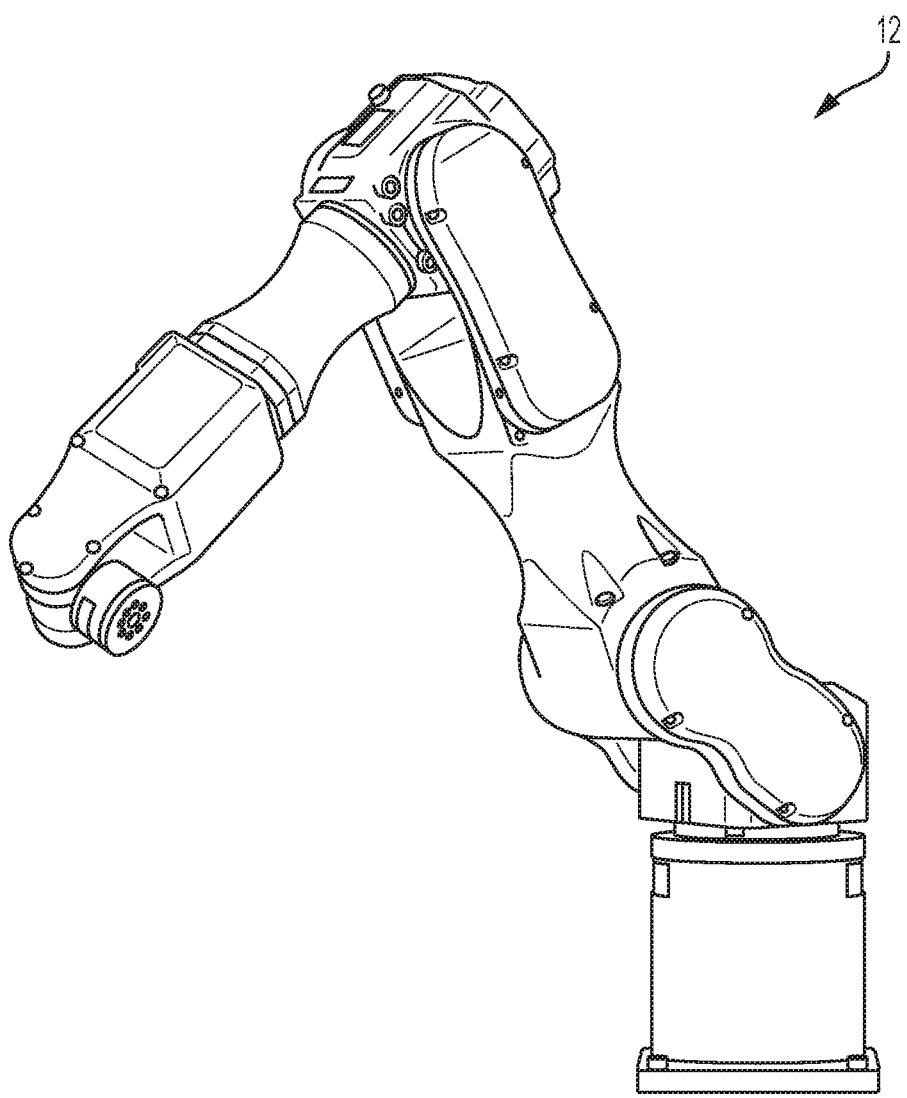
FIG. 2 shows a three-dimensional perspective view of a robotic system, according to an embodiment of the present disclosure.

FIG. 2 shows a three-dimensional perspective view of a robotic system 12, according to an embodiment of the present disclosure. In an embodiment, the robotic system 12 is a six-axis robotic arm system such as Epson C4L robot made by Epson Corporation. According to embodiments, the Epson C4L robot system has a maximum reach of 900 mm (~35"). The robotic system 12 is configured to move a film sample to be analyzed or tested between stations provided on a work surface 22 or common framework. For example, the robotic system can be connected to a material holder system, as described below in connection with FIG. 3. Other types of robotic systems besides the robotic arm shown in FIG. 2 can be used to move a film sample between stations provided on the work surface 22.

Figure 3:
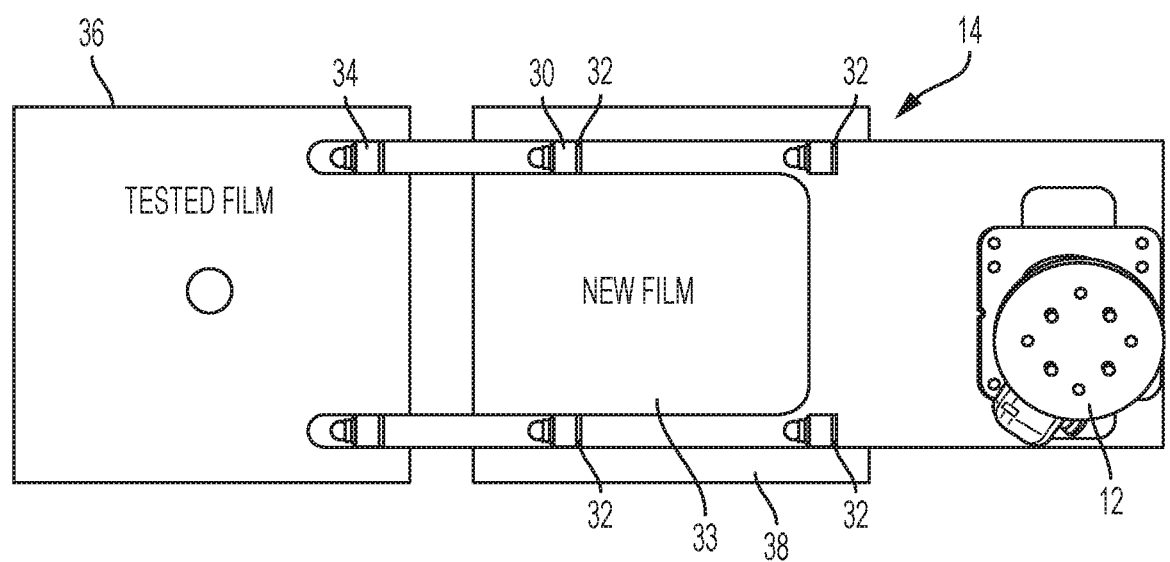
FIG. 3 shows a three-dimensional perspective view of a material holder system, according to an embodiment of the present disclosure.

FIG. 3 shows a three-dimensional perspective view of a material holder system, according to an embodiment of the present disclosure. The material holder system 14 is connected to one end of the robotic system 12 shown in FIG. 2. For example, in an embodiment, the material holder system 14 is attached to an arm of the robotic system 12 using fasteners. The material holder system 14 is configured to hold and move the film sample. In an embodiment, the material holder system includes a vacuum suction system 30 adapted to hold the film sample through vacuum suction. In an embodiment, the vacuum suction system 30 includes two pairs of suction cups 32 configured to hold the film sample substantially flat on each corner of the film so as to prevent film sag. In an embodiment, the vacuum suction system further includes a third pair of suction cups 34 so as to increase the efficiency with which the film samples are moved around the work surface. For example, by providing a third pair of suction cups 34, a previously tested film sample 36 can simultaneously be picked up while a new film sample 38 is placed for testing.

Although suctions cups are described herein as being used to hold the film sample, other mechanisms or systems can also be used to hold the film sample depending on the type of material. For example, the suction cups may be well suited for holding non-porous and relatively light samples, such as various plastics and polymer materials. Therefore, if, for example, porous materials are used, then the suction cups may be replaced by other holding mechanisms such as magnets, clips, or some other type of gripping mechanism.

Figure 4:
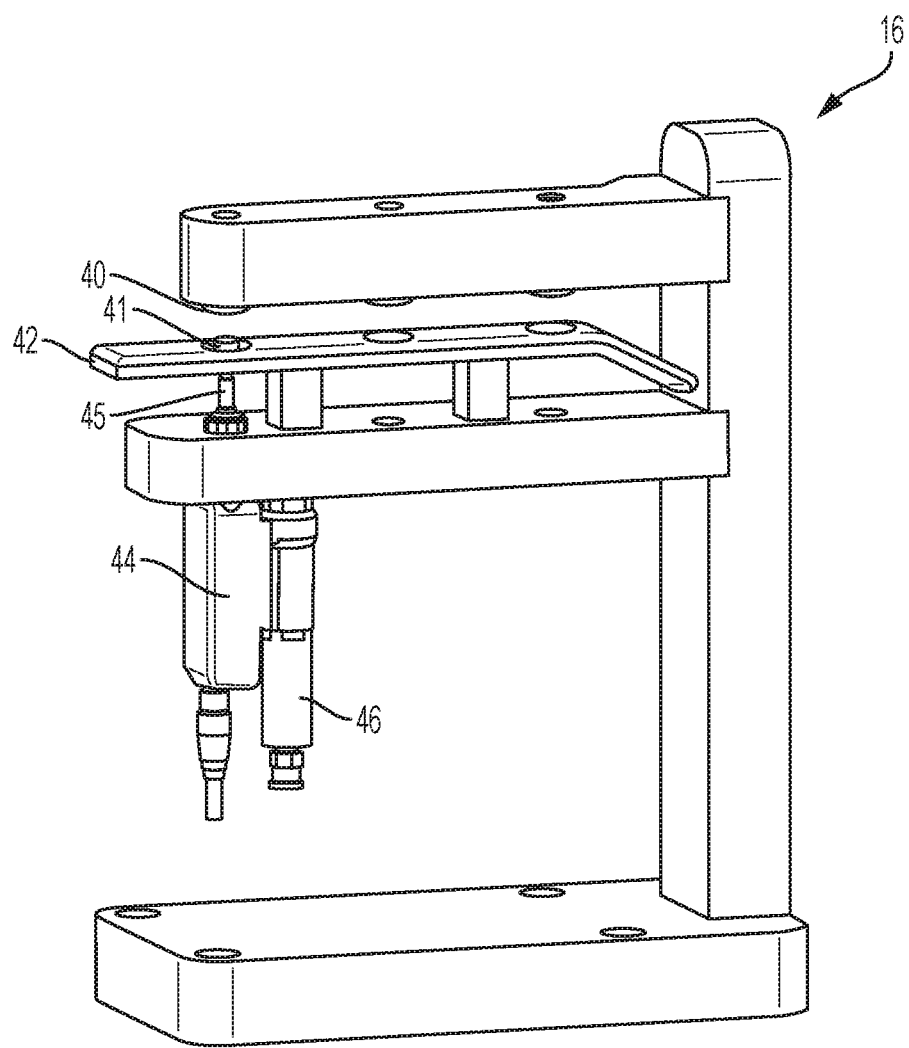
FIG. 4 shows a three-dimensional perspective view of components of a thickness measurement system, according to an embodiment of the present disclosure.

FIG. 4 shows a three-dimensional perspective view of the components of a thickness measurement system, according to an embodiment of the present disclosure. The thickness measurement system 16 is configured to measure a thickness of the film sample in a wide range of thicknesses, for example between 0.5 mil (12.7 micrometer) to 10 mil (250 micrometer). The thickness measurement system 16 is configured to measure a thickness of the film using a contact plate 40 and a probe 41. The contact plate 40 and the probe 41 are generally flat and contact the film on opposing surfaces thereof, and the thickness of the film is measured as the distance between the contact plate 40 and the probe 41. The surface of both the contact plate 40 and the probe 41 is sufficient to avoid puncturing the film sample during the measurement. The contact plate 40 and probe 41 have the benefit of spreading out the force of the thickness gauge and preventing the film sample from becoming deformed during the measurement. For example, the contact plate 40 and probe 41 can be configured to be used for materials that are flexible and pliable or for more rigid samples.

The thickness measurement system 16 also includes a high-accuracy digital contact sensor 44 (for example, Keyence GT2 Series from Keyence Company). The sensor 44 is used to measure the thickness of the film sample to an accuracy of 1 micron (0.04 mil). The sensor 44 is selected for its accuracy. The probe 41 is mechanically linked to the sensor 44. The thickness measurement system 16 also includes a ramp 42 that is arranged so that the film sample (not shown) does not catch on either the top or bottom contacts of the sensor 44. Once the film is in place between contact plate 40 and probe 41, pressurized air from air-pressure system 46 is applied to the sensor 44 that extends shaft 45 linked to sensor 44 and to probe 41 to move the probe 41 to measure the thickness of the film.

Although a mechanical type thickness measurement system 16 is described and used, other types of thickness measuring systems can also be employed. For example, in another embodiment, the thickness measurement system 16 includes laser distance measuring sensors adapted to determine the thickness using laser beams. For example, dual laser thickness analyzers can be used to measure a thickness of the film sample. In yet another embodiment, capacitive measurement systems can be used to measure a thickness of the film. Capacitive (or generally impedance) measurement systems are based on measuring the capacitance (or impedance) across the material.

Figure 5:
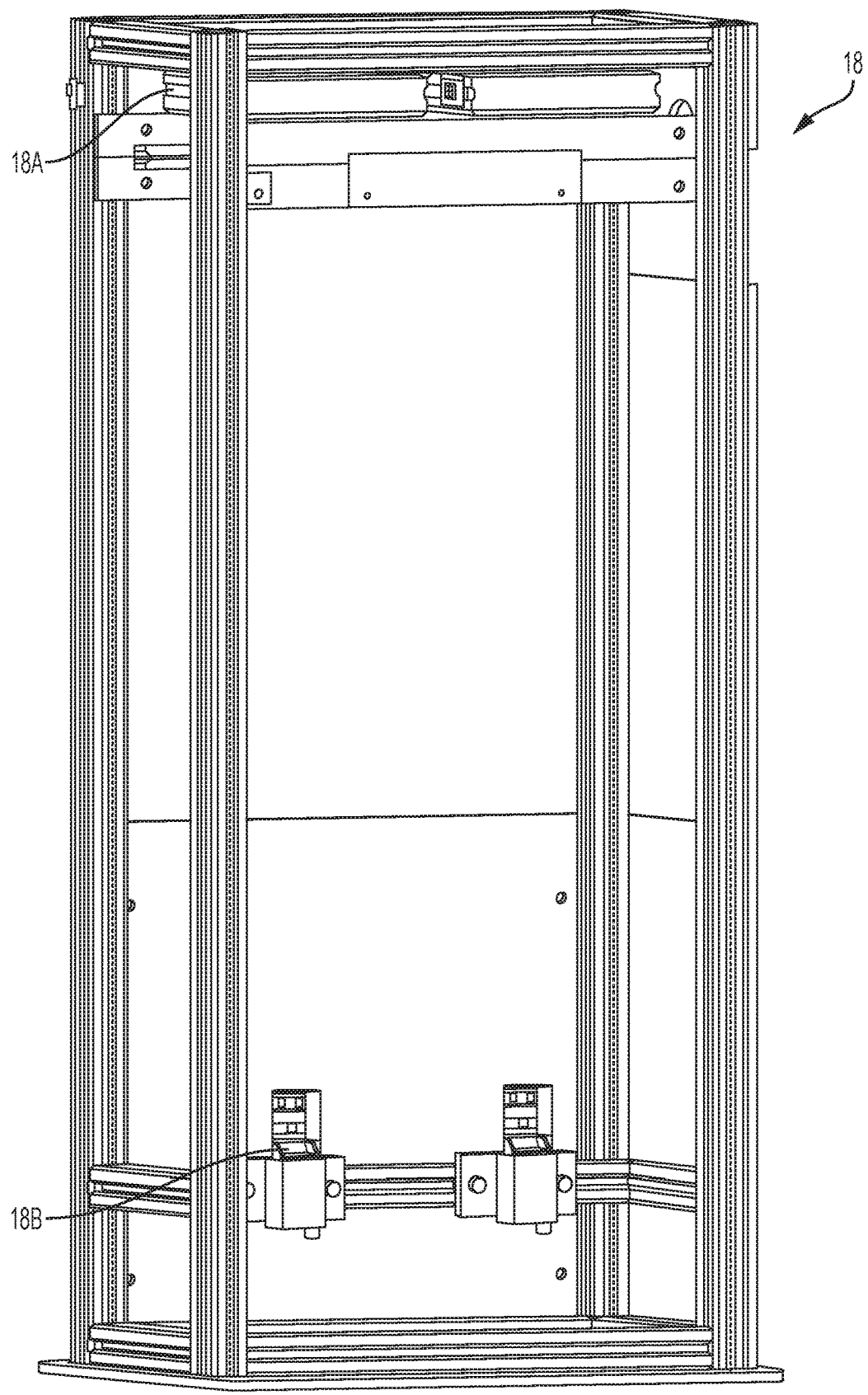
FIG. 5 shows a three-dimensional perspective view of a material image analyzer system for analyzing defects in the film sample, according to an embodiment of the present disclosure.

Referring back to FIG. 1, before or after thickness measurement at the thickness measurement system 16, the film sample is moved by the robotic system 12 to the material image analyzer system 18. FIG. 5 shows a three-dimensional perspective view of a material image analyzer system for analyzing defects in the film sample, according to an embodiment of the present disclosure. In an embodiment the material image analyzer system 18 is based on the principle of polarized light. The term "defect" is used herein to include any imperfections or irregularities in the film sample. The material image analyzer system 18 is configured to detect defects in a film sample to be tested. A source of polarized light 18A is used to illuminate the film within the analyzer system 18, while eliminating any ambient light. After the light passes through the film, it is captured by a camera 18B fitted with a polarizing filter. A perfectly formed film does not scatter the polarized light from the source thus resulting in a completely clear image. However, any imperfections/defects in the film scatters light that are detected by the camera. A machine vision algorithm then identifies and tags films with significant defects. Therefore, the material image analyzer system 18 is based on detecting defects caused when polarized light passing through the film sample is affected by certain physical defects present in a sample. Because the material image analyzer system relies on polarization of light, when the material to be tested is changed, the polarization may also change which would potentially indicate a defect to be present where there is none. However, as part of the analysis aspect, defect or irregularity analysis is shifted to the data interpretation and is conducted by looking at the range of results from a film and identifying the outliers based on standard deviation and distance from the mean. Therefore, the present method of determining defects is independent of the material and is a more universal solution to the problem. In an embodiment, alternatively, the material image analyzer system 18 may include a gel tester that is configured to quantitate and identify the types of defects. Examples of gel testers include optical control system (OCS) testers. Other types of material image analyzer systems than the one described above can alternatively be used. For example, optical light transmittance analyzer systems or ultrasound defect detection systems can be used to detect defects in a film sample.

Figure 6A:
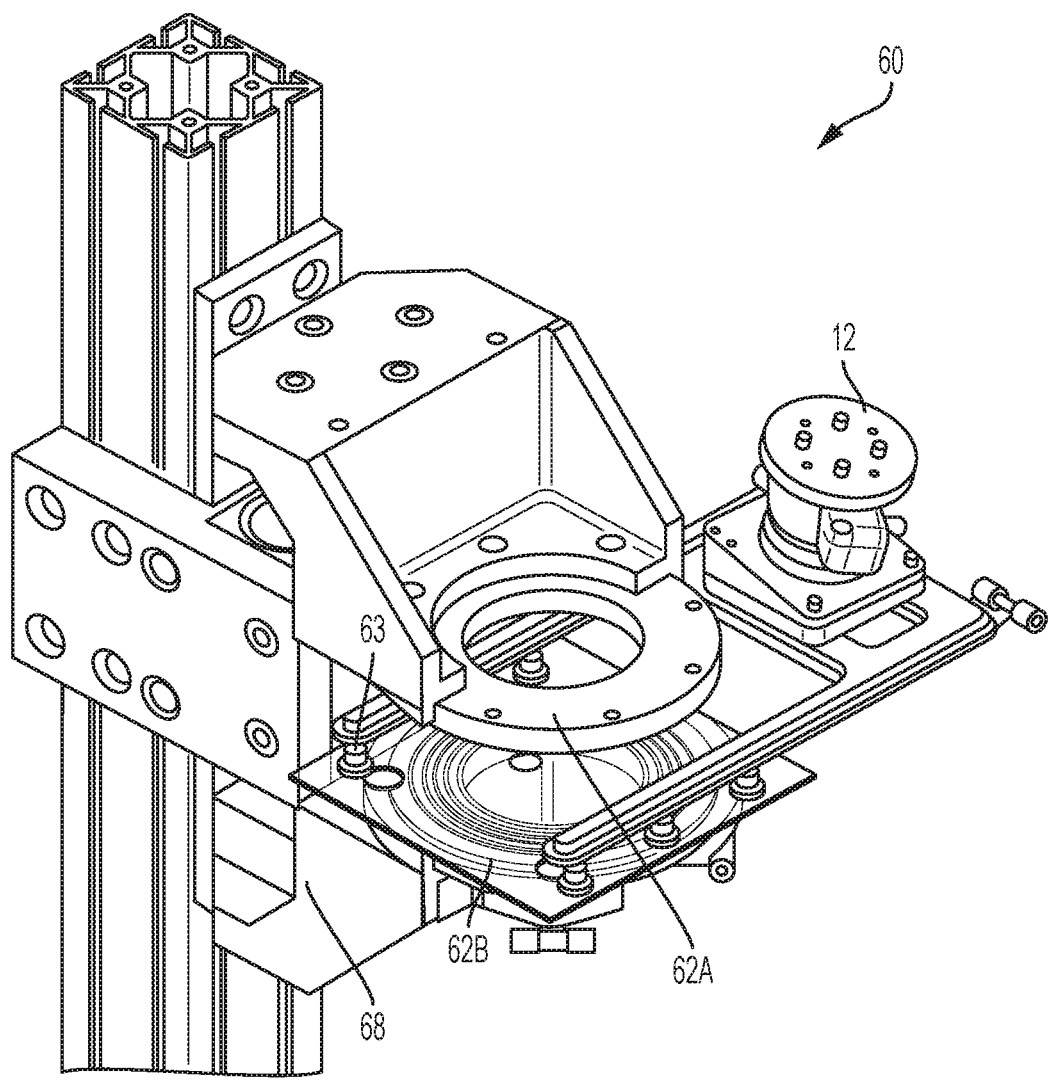
FIG. 6A is a three-dimensional perspective view of a clamping system, according to an embodiment of the present disclosure.
Figure 6B:
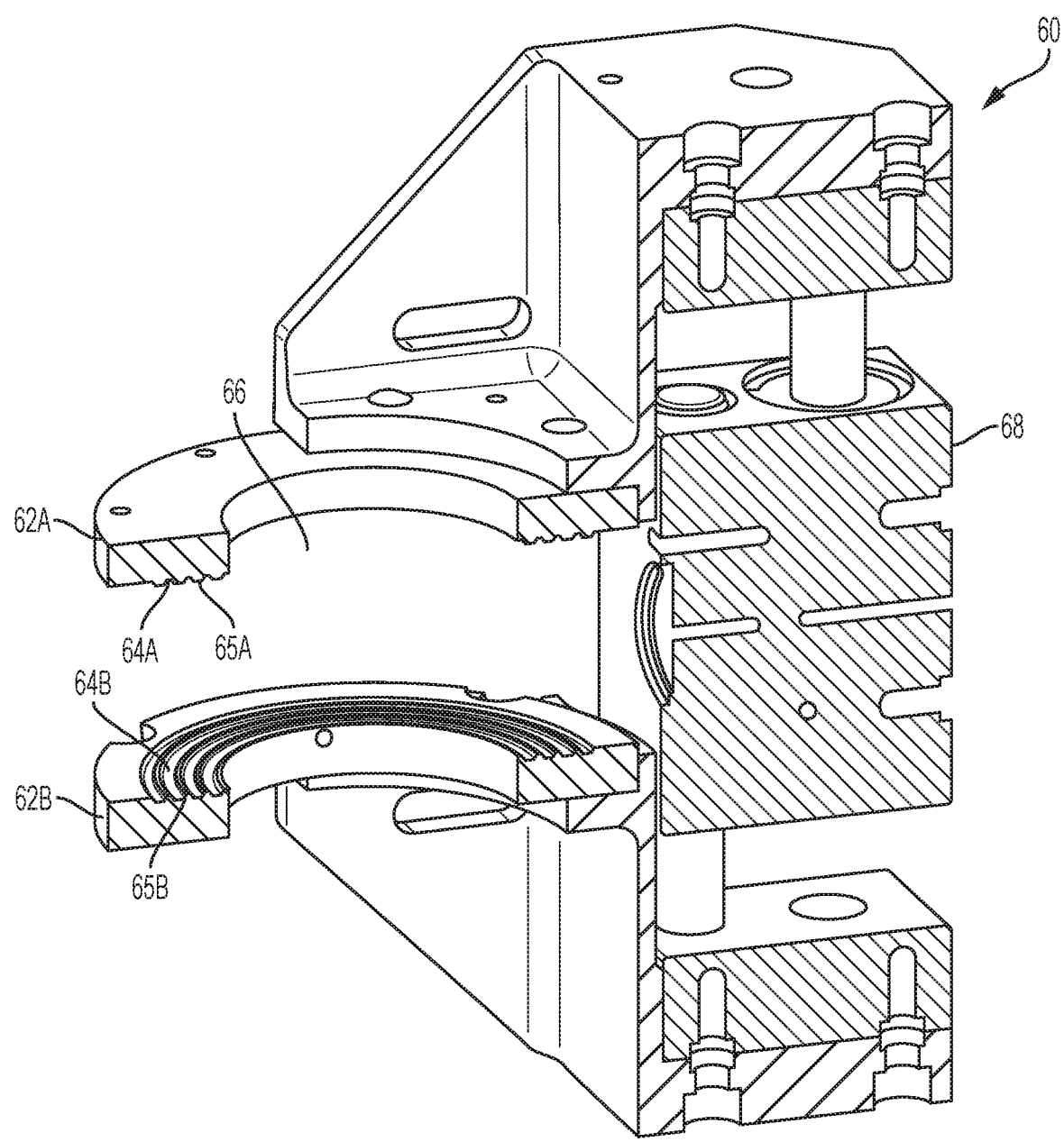
FIG. 6B shows a cut-away view of the clamping system, according to an embodiment of the present disclosure.

Following the defect analysis, the film sample is moved by the robotic system 12 to the dart testing system 20. The dart testing system is configured to test the physical characteristics of a film sample. In an embodiment, the physical characteristics include elasticity and strength of the film sample. Referring to FIGS. 6A and 6B, the dart testing system 20 includes a film clamping system 60. FIG. 6A is a three-dimensional perspective view of the clamping system 60, according to an embodiment of the present disclosure. FIG. 6B shows a cut-away view of the clamping system 60, according to an embodiment of the present disclosure. The film clamping system 60 plays a role in ensuring the accuracy of the test. The clamping system 60 includes two jaws 62A and 62B. In an embodiment, the jaws 62A and 62B are circular, i.e., have a circular or annular shape. However, the jaws 62A and 62B can also have a different shape such as a polygonal shape. In an embodiment, the two jaws 62A and 62B comprise corresponding surface geometries that completely or partially mate with one another when the jaws 62A, 62B are closed against one another. For example, as shown in the cut-away of FIG. 6B, the upper jaw 62A is provided with a pattern of grooves 64A and ridges 65A. The lower jaw 62B is provided with matching grooves 64B and ridges 65B. The ridges 65A in the upper jaw 62A are configured to mate with grooves 64B in lower jaw 62B. Ridges 65B in the lower jaw 62B are configured to mate with grooves 64A in upper jaw 62A. The grooves 64A, 64B and ridges 65A, 65B are configured to pull the film taut when the two jaws 62A, 62B close on each other. The grooves 64A, 64B and ridges 65A, 65B are further configured so that no undue stresses are applied on the film in the process. In an embodiment, the grooves and ridges are circular. In an embodiment, a width of a ridge is slightly smaller than a width of a groove so as to provide sufficient space for the film sample to be caught between, but not cut by, the opposing ridges and grooves. The jaws 62A and 62B define a centrally located aperture, such as a hole 66. In an embodiment, the central hole 66 is 3" (7.6 cm) in diameter (specified by the ASTM testing standard). The two jaws 62A and 62B are actuated by a parallel jaw pneumatic gripper 68 (obtained from Schunk) that can be actuated to open and close the jaws 62A, 62B. In an embodiment, the bottom jaw 62B includes four suction cups 63 (shown in FIG. 6A) that hold the film in place while the film clamping system 60 is open. Other clamps than shown in FIGS. 6A and 6B can be used to hold the film sample during the dart test. In an embodiment, a pressure between 10 psi (0.68 bar) and 50 psi (3.45 bar), e.g., 15 psi (1.03 bar) is applied by the parallel jaw pneumatic gripper 68 to close the two jaws 62A and 62B to hold the film sample therebetween. However, other pressures are possible provided the applied pressure does not shear the film sample.

The functionality of the clamp assembly 60 is tested to confirm that (a) the film sample is pulled taut when the clamp closes and there is no undue stress/stretching of the film due to the clamp and (b) the film sample does not slip in the clamp throughout the testing process. A high speed camera system is used to help gather qualitative data for these studies.

To test the efficacy of the clamp assembly 60 to pull the film taut, multiple film samples with varying levels of wrinkles and creases are placed in the clamp for different tests. High-speed video is captured from above the clamp assembly 60 as it closes on the film.

Figure 7A:
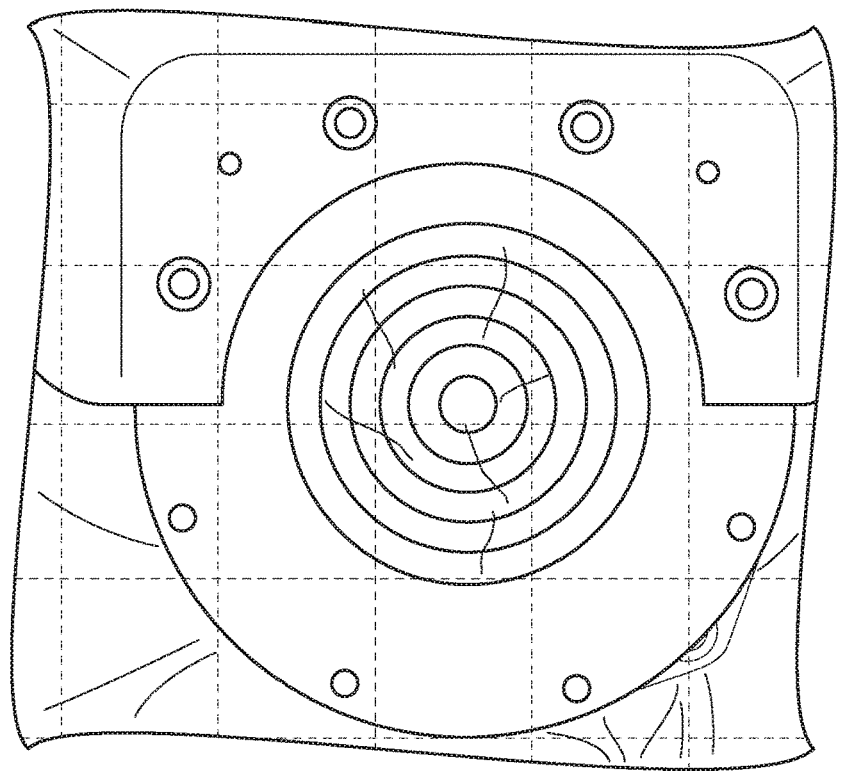
FIGS. 7A and 7B show initial and final frames of a video of a film sample clamped by a clamp assembly, according to an embodiment of the present disclosure.
Figure 7B:
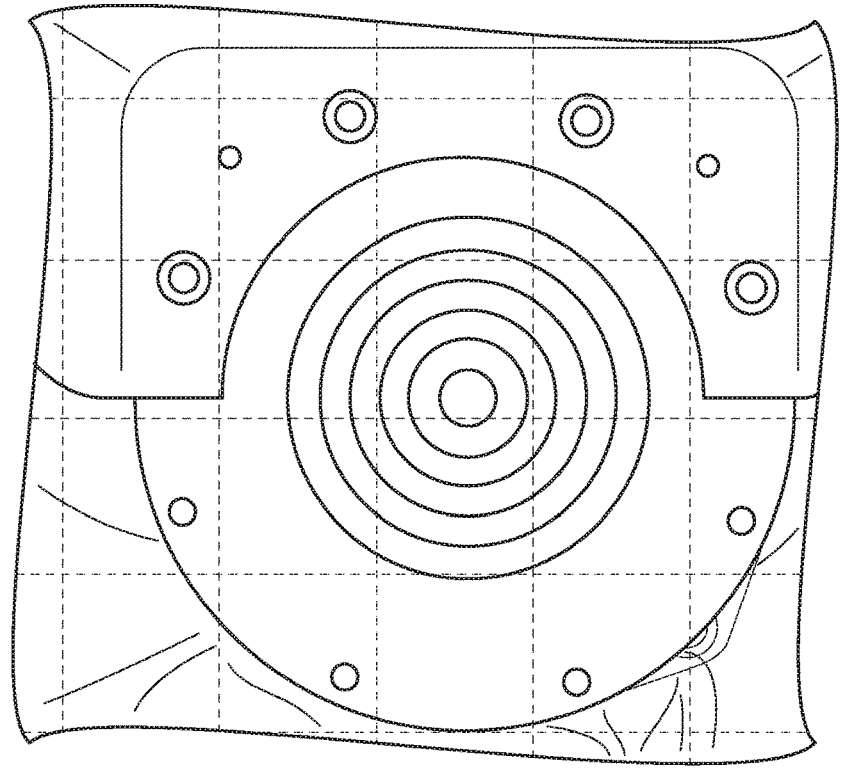

FIGS. 7A and 7B show the initial and final frames of a video of the film sample clamped by the clamp assembly 60, according to an embodiment of the present disclosure. The initial frame in FIG. 7A shows some wrinkles in the film. However, upon closure of the clamp system 60, the final frame in FIG. 7B clearly shows that the film has been pulled taut. Concentric circles were drawn on the film sample before the film sample was placed in the clamp assembly 60. The frames also show that the circles are not significantly altered in shape when the clamp assembly 60 closes. Therefore, the clamp assembly 60 does not negatively impact the film sample while pulling it taut.

Figure 8A:
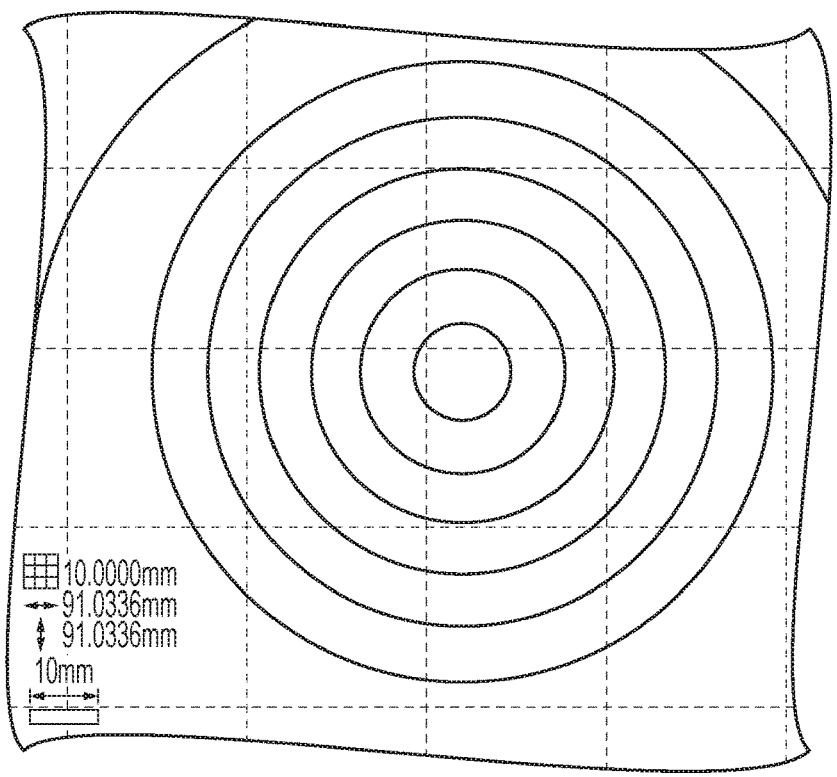
FIGS. 8A and 8B show frames from the film sample when a dart just strikes the film sample (FIG. 8A) and when the film sample is stretched the most (just before puncture) (FIG. 8B), according to an embodiment of the present disclosure.
Figure 8B:
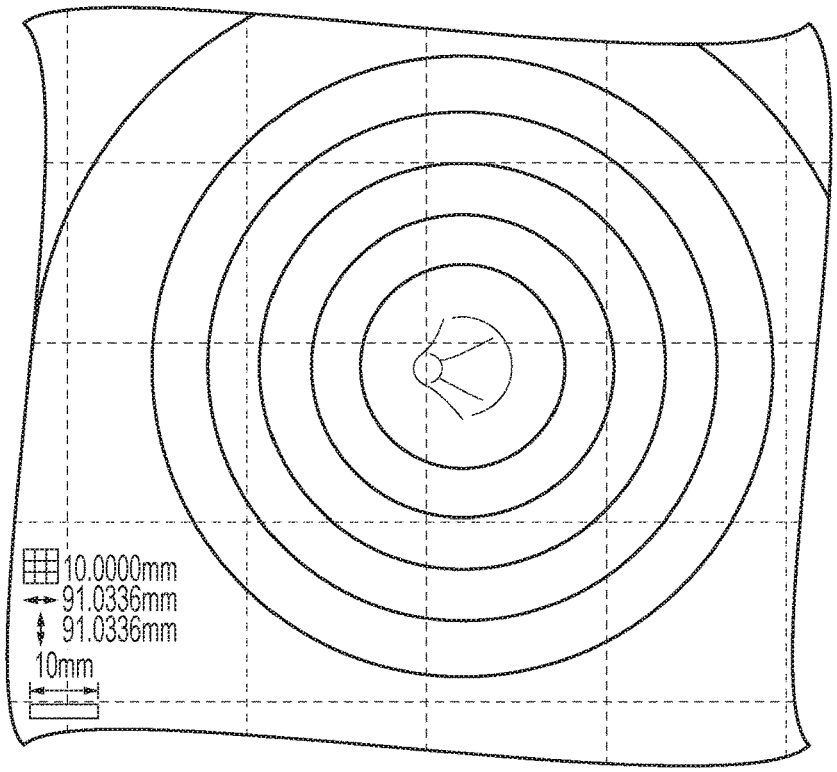

After the film sample is secured by the clamp assembly 60, a dart is moved through the film sample and again, a high-speed video of the test is captured. FIGS. 8A and 8B show frames from the film sample when the dart just strikes the film (FIG. 8A) and when the film is stretched the most (just before puncture) (FIG. 8B), according to an embodiment of the present disclosure. The two frame images in FIGS. 8A and 8B show that the edges of the film sample closest to the clamp jaws remain in place indicating that the film sample does not slip in the clamp assembly 60. The above tests were performed on relatively thin (0.5 mil or 12.7 micrometer) and relatively thick films (10 mils or 254 micrometer) and in both cases the conclusions were the same.

Figure 9:
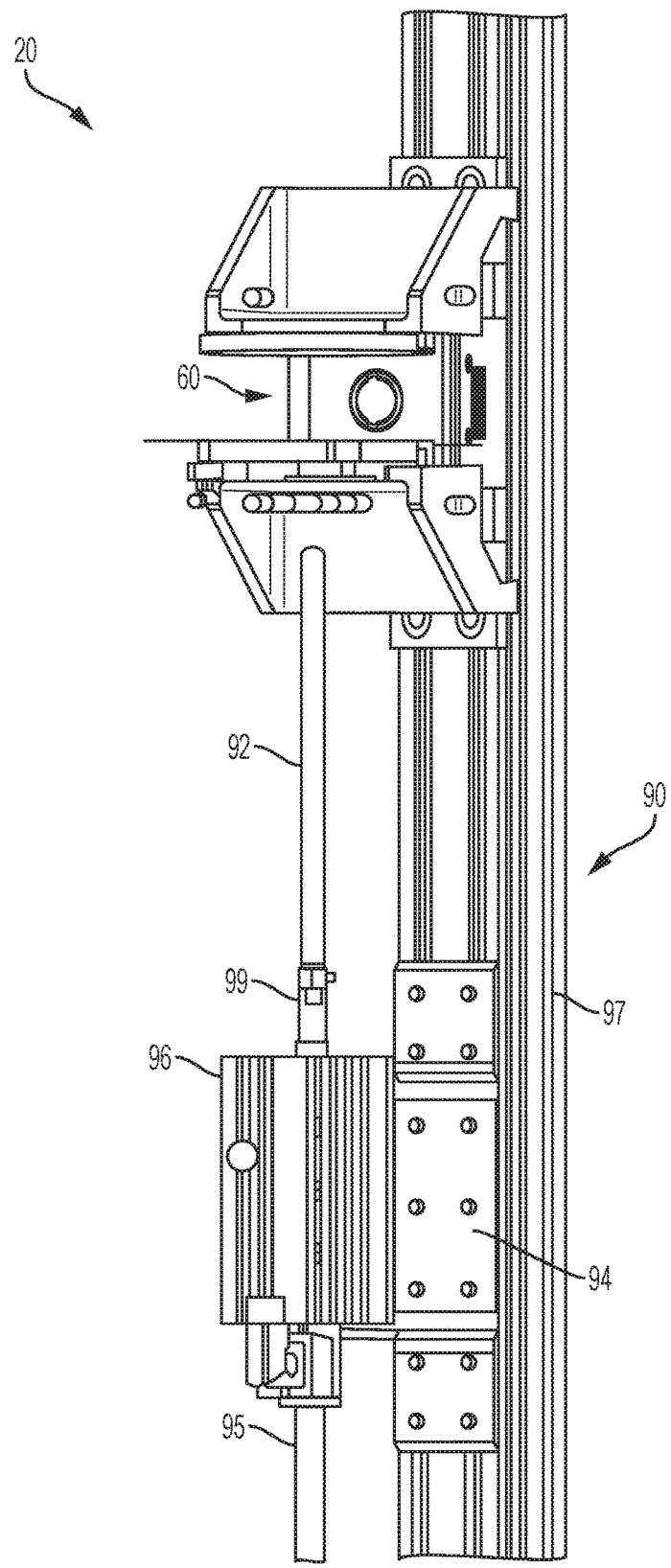
FIG. 9 shows a three-dimensional perspective view of a dart probe mechanism, according to an embodiment of the present disclosure.

Referring to FIG. 9, the dart testing system or device 20 also includes a dart probe mechanism 90. FIG. 9 shows a three-dimensional perspective view of the dart probe mechanism 90, according to an embodiment of the present disclosure. The dart probe mechanism 90 includes a dart probe 92 and a propulsion system 94 that moves the dart probe 92. In an embodiment, the propulsion system 94 includes a linear motor 96 (e.g., a LinMot linear motor from LinMot USA, Inc.) and a controller (not shown) to control the linear motor 96. The linear motor 96 is configured for relatively high acceleration and deceleration while accurately following a prescribed motion profile. In an embodiment, the linear motor provides the flexibility to vary or select a target speed of the dart probe from relatively lower speeds (0.04 m/s) to relatively higher speeds (4 m/s) as well as regulate the speed during a puncture resistance and dart impact test while reaching the target velocity within the allowable range of motion. Furthermore, the linear motor provides the benefit of quick and easy retrieval of the dart probe as the dart probe is linked to the linear motor. The controller can use a conventional proportional-integral-derivative (PID) controller with feed-forward compensation based on estimated motor parameters. Instructions are sent to the controller by the computer system 24 (see, FIG. 1). The computer system 24 is in communication with the controller and the computer system 24 is configured to send a command signal to the controller to control the linear motor 96. The computer system 24 is configured to send a command signal to the controller to load a trajectory and to move the dart probe 92 according to the loaded trajectory. Similarly, feedback data are received by the computer system 24 from the PID controller. The dart probe 92 is attached to a movable slider 95 of the linear motor 96, while the stator is secured to the work surface 22 or frame, for example, by post 97. Because the dart probe 92 is controlled by the linear motor 96, the retrieval process for dart probe 92 is faster and safer than with prior art systems, making possible automated, high-throughput film testing. However, propulsion systems other than the linear motor 96 can be used to move the dart probe 92. For example, a hydraulic system or pneumatic system (e.g., using compressed air) can also be used to move the dart probe 92. A motor can also be used instead of the linear motor 96 to move the dart probe 92.

The dart testing system of device 20 further includes a force sensor 99. The force sensor 99 is configured to measure a force that the dart probe 92 is subjected to during a movement of the dart probe 92. In an embodiment, the force sensor 99 is a piezoelectric force sensor that is installed at a bottom of the dart probe 92, for example between the dart probe 92 and a slider 95 of the motor 94, to measure a force signal during a dart test. Piezoelectric sensors are capable of measuring fast-changing forces accurately. Piezoelectric sensors are well suited for measuring the force form the dart probe 92 which involves a fast-changing force profile. Although a piezoelectric sensor is used herein to measure forces during the dart tests, other types of sensors can also be used to measure the forces.

A dart impact test correlates to the ASTM D1709 standard while a puncture resistance test correlates to the ASTM F1306 standard. The dart testing system 20 is configured for a better velocity regulation and faster probe retrieval. By interchanging the dart probe 92, the dart testing system 20 can perform a puncture resistance test at low speed and a dart impact test at a higher speed.

Figure 10:
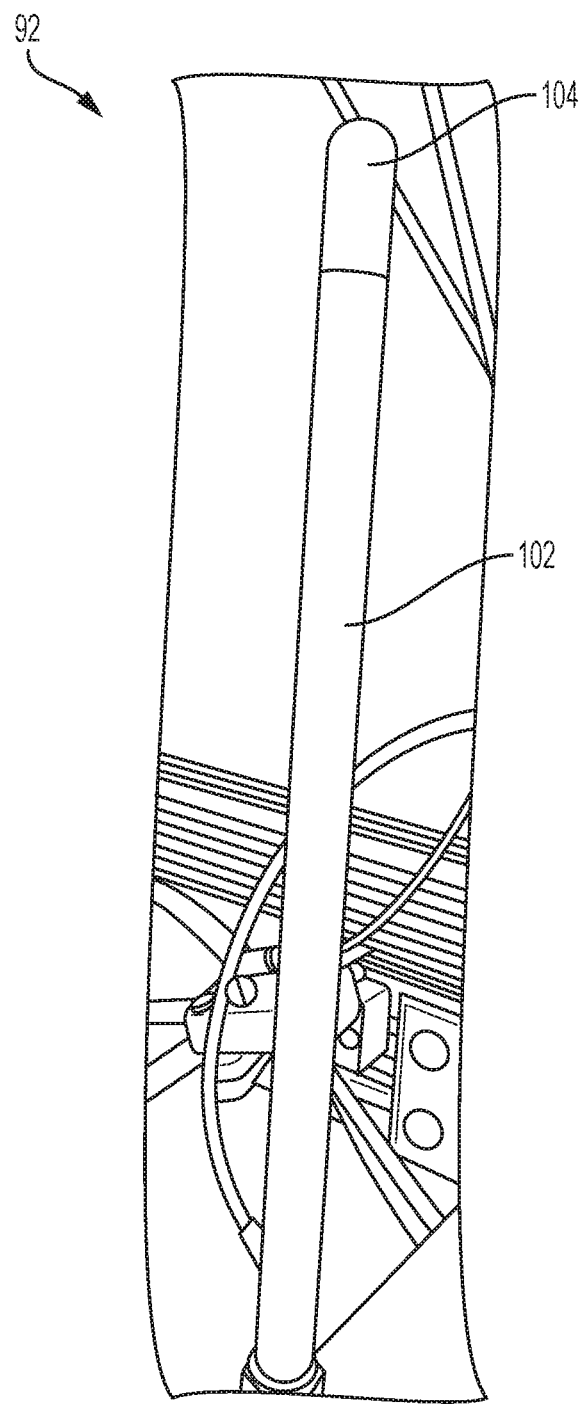
FIG. 10 shows a three-dimensional perspective view of a dart probe, according to an embodiment of the present disclosure.

FIG. 10 shows a three-dimensional perspective view of a dart probe, according to an embodiment of the present disclosure. In an embodiment, the dart probe 92 is built as specified by the ASTM testing standards. In an embodiment, the dart probe 92 is a cylindrical rod 102 with a 0.5" (1.27 cm) in diameter. In an embodiment, the cylindrical rod 102 has a diameter between 0.2" (0.51 cm) and 1" (2.54 cm). The dart probe 92 also has a hemispherical end 104, as specified by the ASTM standard. The hemispherical shape minimizes stress concentration. According to an embodiment, the hemispherical end 104 can have a radius of 0.25 inches (0.63 cm), as specified by the ASTM testing standard. While the ASTM standard specifies that the probe be made of steel, this would make the probe heavy. Therefore, in an embodiment, to minimize the weight of the dart probe 92, the dart probe 92 is constructed to be hollow. Additionally or alternatively, the dart probe 92 is made of Aluminum. To ensure that the dart probe 92 complies with the ASTM standard, the tip 104 can be made from steel. In an embodiment, the tip 104 is fastened, using for example glue, or screwed, to the cylindrical rod 102. The overall length of the probe is about 10" (25.4 cm). In an embodiment, the overall length of the probe is between 6" (15.2 cm) and about 16" (40.6 cm). The weight of the dart probe 92 is approximately 90 g. In an embodiment, the weight of the dart probe 92 is between 50 g and 200 g.

To perform a high speed dart impact test, ASTM standards require that the dart probe travels at 3.3 m/s, preferably substantially constant, at the moment of impact with the film sample to be tested, and continues to travel at no less than 80% of that speed until the film sample is punctured. In an embodiment, the velocity of the dart probe 92 is 3.3 m/s at impact with the film sample and the velocity remains more than 80% of 3.3 m/s until the film sample is punctured by the dart probe 92. To achieve this speed profile over a reasonable travel distance, careful planning of the trajectory may be needed. There are three phases to the trajectory: acceleration from rest to 3.3 m/s before contact with the film sample, constant velocity of 3.3 m/s, and deceleration from 3.3 m/s to rest after the film sample is punctured. Due to acceleration and deceleration, the force sensor 99 records the G-forces in the acceleration and deceleration phases. The data from the acceleration and deceleration phases are discarded as will be explained further in the following paragraphs. Ideally, these forces would not exist in the constant velocity portion of the trajectory and would not contaminate the force measurements due to the probe's impact with the film sample. However, if the acceleration profile is too aggressive, the PID position control system cannot keep up with the target position initially, and eventually overshoots the target velocity in the constant velocity region. This produces an oscillation in the motion of the dart that is reflected in the force sensor 99. In order to avoid this undesirable situation, a smooth trajectory can be established to minimize sudden changes in acceleration. The gains on the PID controller can be adjusted to ensure that the system is over-damped or non-oscillatory. Although the velocity of the dart probe 92 is described above as being equal to 3.3 m/s at impact, the velocity of the dart probe 92 can be adjusted from a relatively low 0.04 m/s to perform puncture resistance tests to 4 m/s to perform high speed dart impact tests.

Figure 11A:
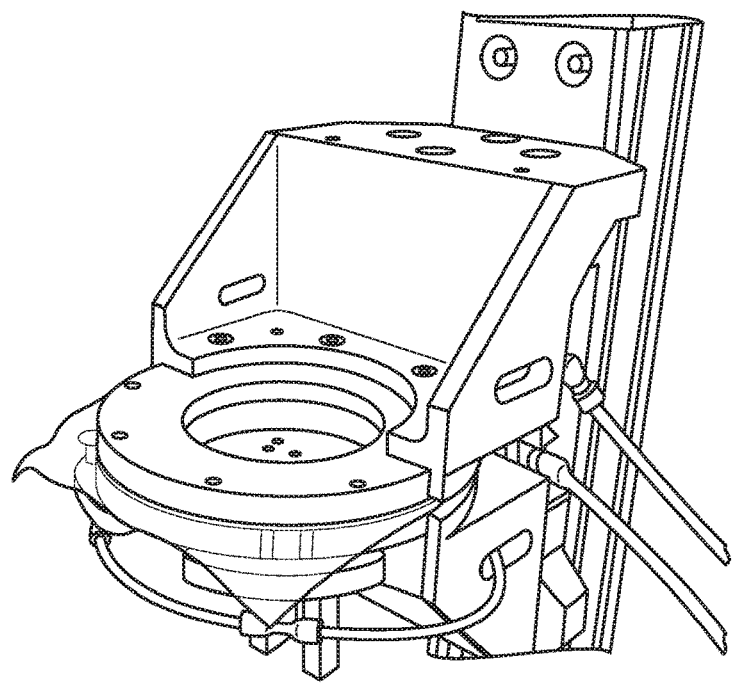
FIGS. 11A and 11B show side views of the film sample clamped by the clamp just before the dart probe comes into contact with the film sample and after the dart probe comes in contact with the film sample and stretches the film to a maximum just before puncture, respectively, according to an embodiment of the present disclosure.
Figure 11B:
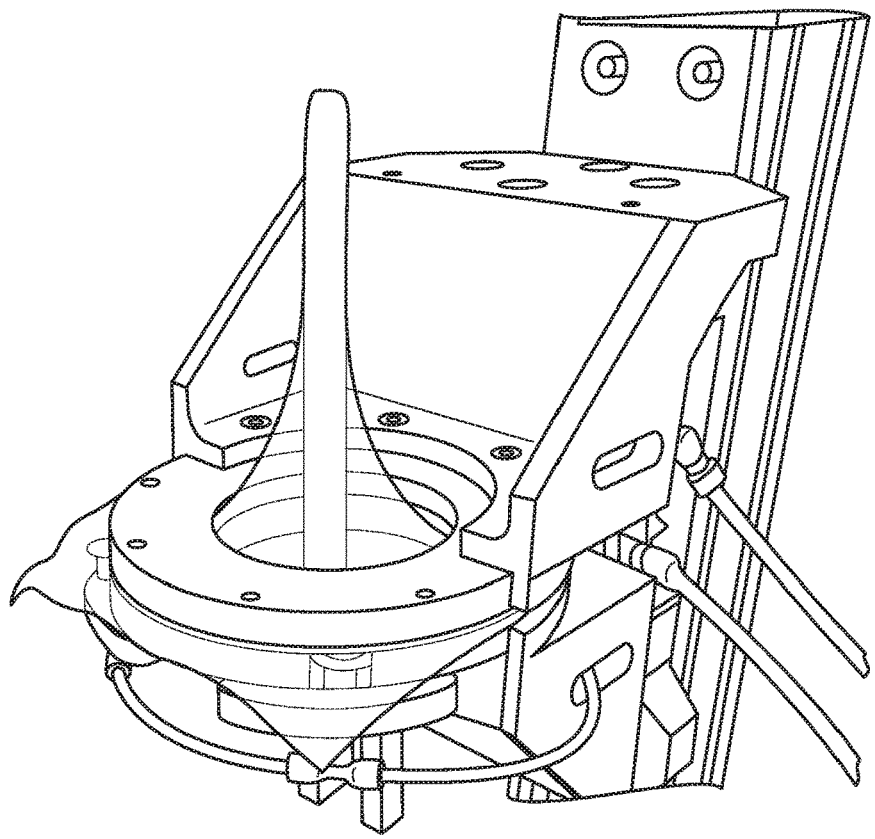

FIGS. 11A and 11B show views of the film sample clamped by the clamp just before the dart comes into contact with the film sample and after the dart comes in contact with the film sample and stretches the film sample to a maximum just before puncture, respectively, according to an embodiment of the present disclosure.

To keep testing conditions substantially the same for all film samples to be tested, a common film format is selected for the test samples. For example, in one embodiment, a 6"×6" (15.2 cm×15.2 cm) piece of film is selected as the common format. For example, this size is large enough to be securely held in the 3" (7.6 cm) diameter clamp 60 for the dart test. Furthermore, a conventional die is available to cut films in this format. However, as it can be appreciated, other sizes and formats can also be used.

Figure 14:
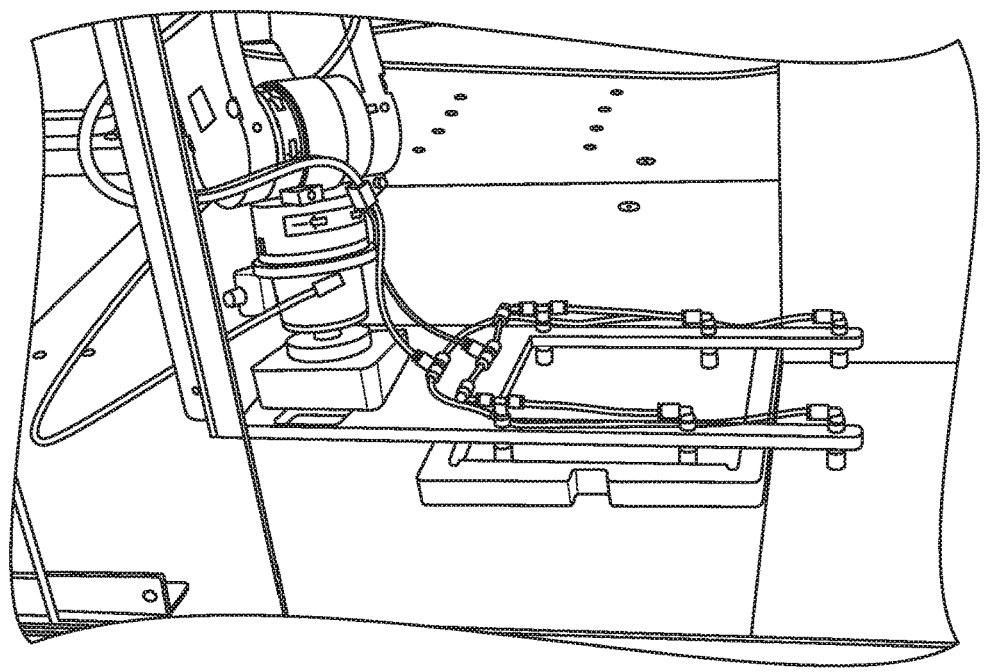
FIG. 14 shows the robotic system picking up the film sample using the material holder system, according to an embodiment of the present disclosure.
Figure 15:
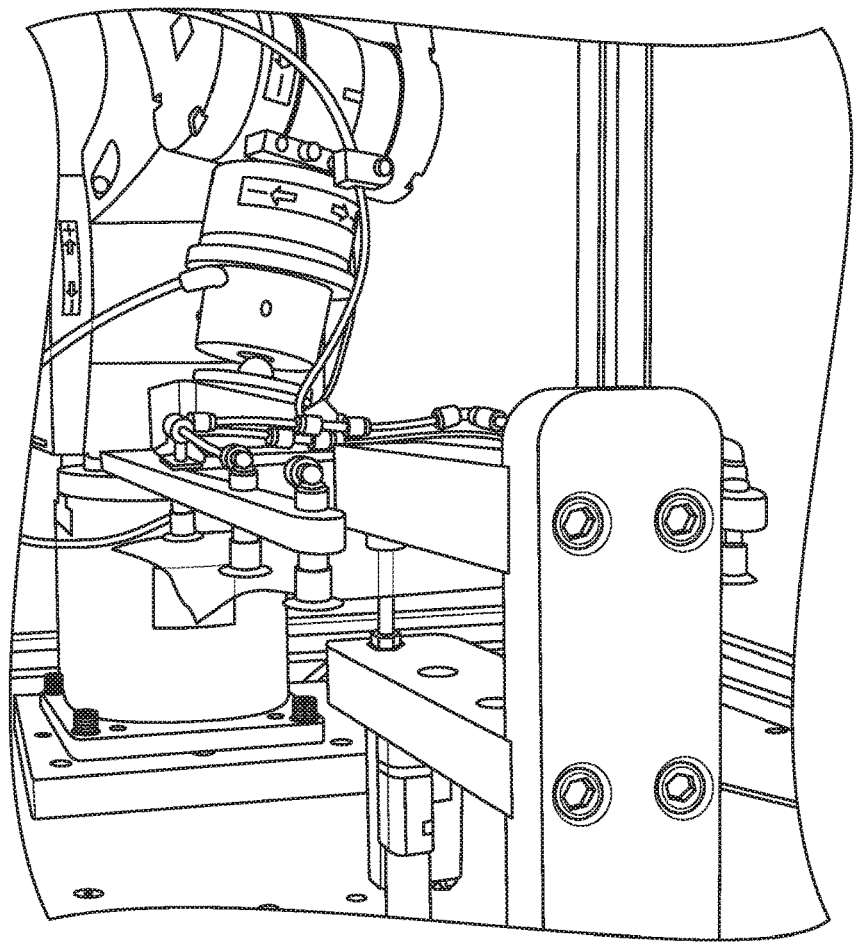
FIG. 15 shows measuring a thickness of the sample using a material thickness measurement system, according to an embodiment of the present disclosure.
Figure 16:
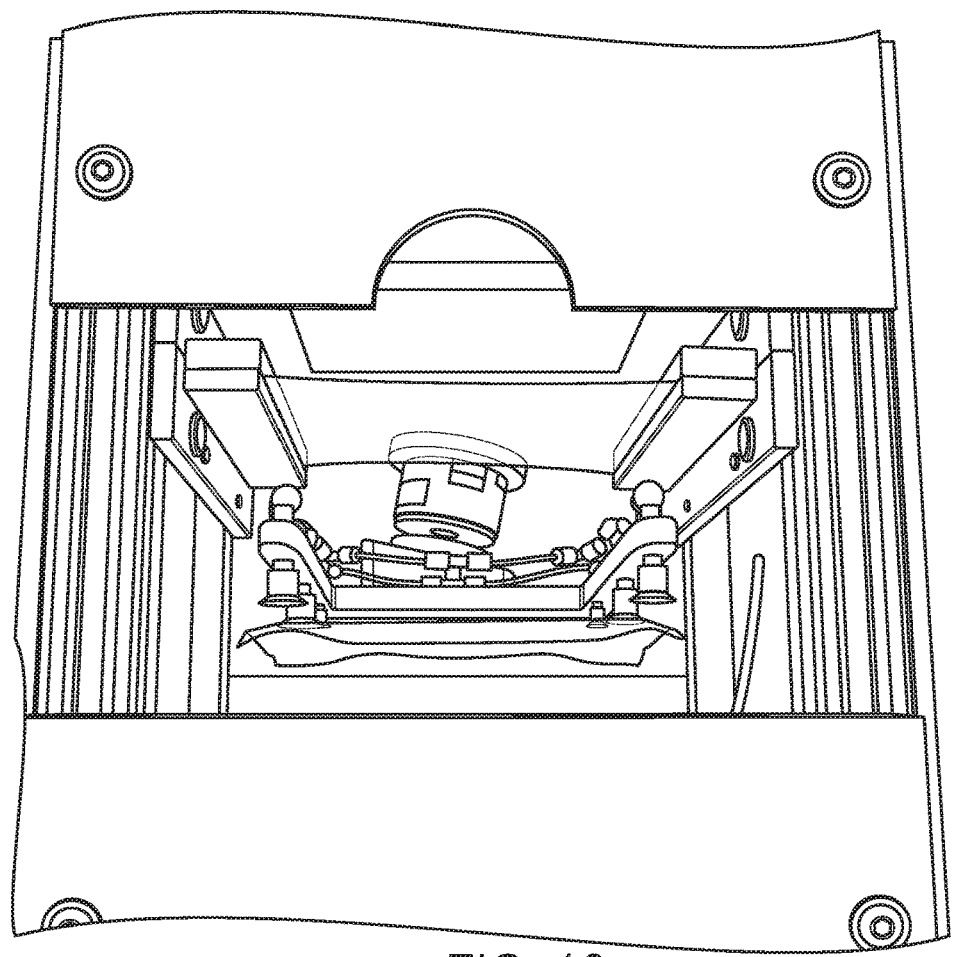
FIG. 16 shows performing a defect analysis using a material image analyzer system, according to an embodiment of the present disclosure.
Figure 17A:
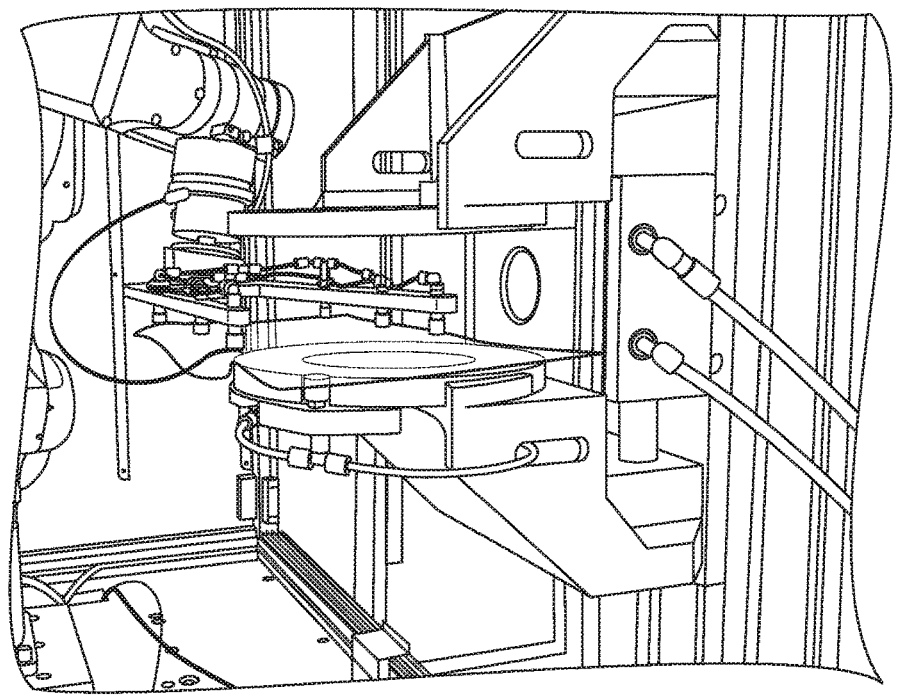
FIG. 17A shows the robotic system picking up a tested film sample from a dart testing system, according to an embodiment of the present disclosure.
Figure 17B:
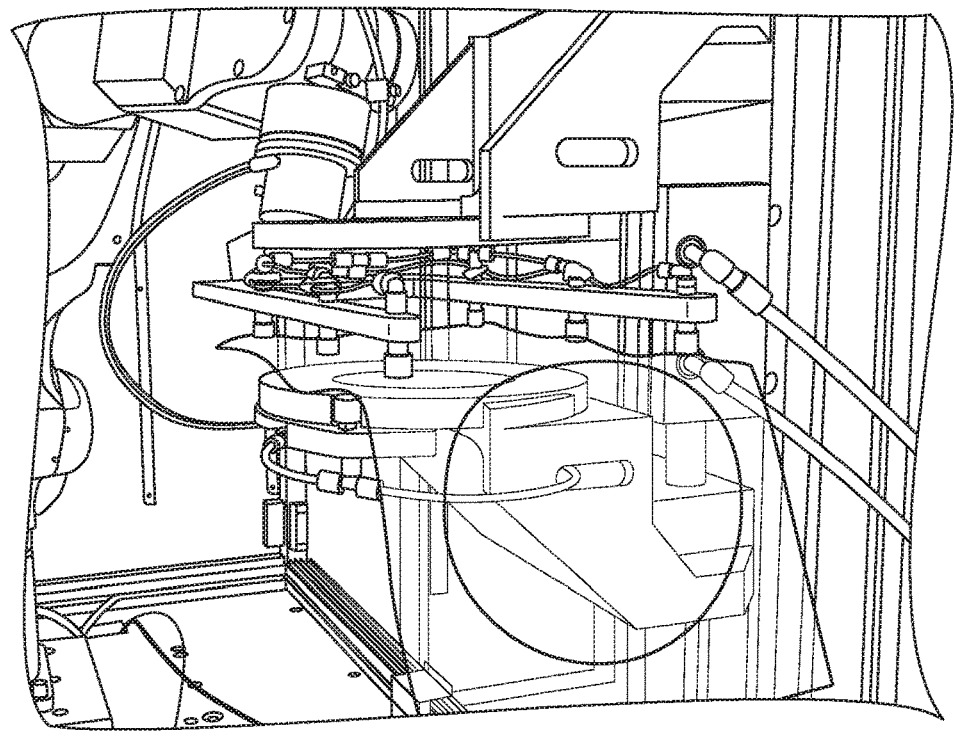
FIG. 17B shows the robotic system placing a new untested film sample in the dart testing system, according to an embodiment of the present disclosure.
Figure 18:
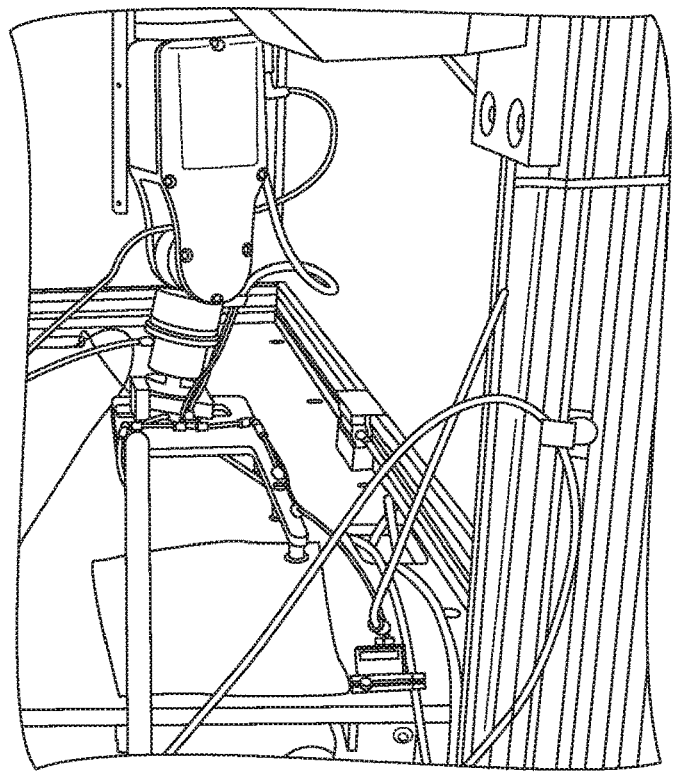
FIG. 18 shows the robotic system disposing of the tested film sample.

An exemplary the testing procedure for the dart system includes the following steps:
 (a) picking up a film sample by the robotic system 12 using the material holder system 14, as shown in FIG. 14,
 (b) measuring a thickness of the film sample using the material thickness measurement system 16, as shown in FIG. 15,
 (c) placing the film sample in the clamp 60 in the dart testing system 20, as shown in FIGS. 17A and 17B. FIG. 17A shows the robotic system 12 picking up a tested film sample from the dart testing system 20. FIG. 17B shows the robotic system 12 placing a new untested film sample in the dart testing system 20.
 (d) moving the dart probe 92 in the dart testing system 20,
 (e) collecting data and results of the dart test by the computer system 24, and
 (f) disposing of the tested film sample, as shown in FIG. 18.
 Optionally, the test procedure can also include performing a defect analysis on the film sample using material image analyzer system 18, as shown in FIG. 16

The sample can comprise a 6" (15.2 cm) square film.

With respect to step (a), a 6" (15.2 cm) square film can be placed on a sample receptacle and a test sequence is initiated. The robotic system 12 picks up the film sample using the material holder system 14. In an embodiment, the pick-up motion is performed at an appropriate speed to avoid dropping of the film sample.

With respect to step (b), the robotic system 12 moves the film to the thickness measurement system 16. In an embodiment, two separate measurements are made by the thickness measurement system 16. A first measurement is performed with no film sample present to obtain a zero reading and a second measurement is performed with the film sample in place. The difference between the second and the first measurements provides the thickness of the film sample. By measuring zero value for each reading, the thickness measurement system 16 can account for any long term drift/build-up in the sensor. However, measuring the zero value may also be performed once if there is confidence in the zero value (i.e., the zero value does not change from measurement to measurement). Alternatively, the zero value may be measured after a plurality of measurements or at regular periods of time to take into account any potential drift that may occur with time.

With respect to step (c), when the film sample is ready for testing, the clamp 60 of the dart testing system 20 is opened and the material holder system 14 attached to the robotic system 12 first removes any old film that is in the clamp 60 (if a film is present in the clamp) and places a new film sample in the clamp 60. As depicted in FIG. 3 and FIGS. 17A and 17B, this is accomplished by controlling vacuum suction cups 34 on the material holder system 14 to grab and remove any used/tested film 36 from the clamp 60 (see, FIG. 17A) and by controlling the pair of vacuum suction cups 32 to hold the new film sample 38 and placing the new film sample 38 between the two jaws 62A and 62B of the clamp 60 (see, FIG. 17B) while still holding the tested/used film 36 with vacuum suction cups 34. By using the pair of vacuum suction cups 34, a previously tested film sample 36 can simultaneously be grabbed and picked up while a new film sample 38 is grabbed and placed for testing. This increases the efficiency of the overall system. Instead of moving the robotic system 12 to remove a tested film and then to place a new film sample for testing, a single move of the robotic system 12 picks up the tested film sample while at the same time places a new film sample for testing. The set of suction cups 63 on the clamp 60 (see, FIG. 6A) are then controlled to hold the film sample 36 in place between the two jaws 62A and 62B. The already tested film sample is removed by moving the material holder system 14 with the robotic system 12 and placing it in an area for disposal, as shown in FIG. 18. Once the robotic system 12 with the material holder system 14 withdraws from the space of clamp 60, the clamp 60 is closed and the placed new film sample is held taut between the jaws 62A and 62B of the clamp 60. Thus, the new film sample is ready to be tested.

With respect to step (d), the linear motor 96 (see, FIG. 9) is initialized when the system is started including homing of the linear motor 96 (see, FIG. 9) to a consistent starting position. In an embodiment, once the linear motor 96 is initialized, multiple tests can be run without re-initializing the linear motor 96. In an embodiment, the linear motor 96 of the dart testing system 20 can be re-initialized periodically, e.g., daily, to insure that the linear motor 96 returns to a same starting position. The dart probe 92 of the dart testing system 20 is then moved by the computer system 24 instructing the PID controller of the dart testing system 20 to load a specified trajectory and to send a command to the linear motor 96 to move the dart probe 92.

With respect to step (e), a command is also sent by the computer system 24 to a data acquisition system in communication with the computer system 24 and in communication with the force sensor that measures a force signal during a dart test to start data collection. This command can be sent substantially simultaneously with the moving of the dart command, or can also be sent sequentially with the moving of dart command. After the testing is complete, the motor returns to its initial position.

With respect to step (f), the used film sample can then be lifted by the material holder system 14 using the robotic system 12 and placed in a trash bin which can be periodically emptied by an operator. This completes the cycle and the system returns to its initial state, ready to pick up a next film sample, e.g., from or when it arrives at the receptacle.

According to an embodiment, the robotic system 12 moves the film sample to the material image analyzer system 18. As described in the above paragraphs, an image of the film is captured through a polarizing filter while illuminated with polarized light. The image can be stored for further analysis (either automated image analysis or manual analysis at a later time) to determine whether the film sample has any defect, or any defect that would materially affect the test results.

In addition to controlling the dart test and collecting data and results of the dart test, in an embodiment, the computer system 24 can be further configured to track the film sample as it progresses through various tests, such that the thickness measurement, defect analysis, and dart test information is correlated for each sample and stored for later reference and analysis. Thus, for example, test data from a defective sample can be flagged and evaluated whether it should be relied on or discarded.

Typically, the time from impact to the puncture of the film sample is in the order of a few milliseconds. In addition, Fast Fourier analysis of the acquired impact signal showed a frequency information content of about 20 kHz. Therefore, the sampling frequency (data collection rate) may be performed at higher than 20 kHz. The frequency spectrum of the data captured shows relevant data at lower frequencies and any noise at higher frequencies. The noise can be eliminated using low-pass filters.

As stated above, sensors are used to measure the force that the probe is subjected to. In an embodiment, a single-axis force sensor is used to measure the force in the dart system. As explained above, in an embodiment, a piezoelectric sensor is selected due to its high bandwidth (36000 Hz) and hence its ability to measure fast changes in force. In an embodiment, a single-axis force sensor from PCB Piezotronics, model ICP Force Sensor, 208C02 is chosen. This piezoelectric sensor has a load capacity of 100 lb. (equivalent to a force of 444 N) in the Z-direction. This sensor is configured for dynamic force applications. Any static load on the sensor will eventually return to zero.

In an embodiment, to confirm the speed of the dart at impact and through the process of puncturing the film, the dart velocity is calculated by taking the numerical derivative of the position signal. To eliminate any numerical noise introduced by this process, a low-pass filtering strategy is used similar to the one used for filtering the force signal.

In an embodiment, the computer system 24 in communication with the dart testing system 20 is configured to collect or acquire force data from the dart testing system 20. In an embodiment, data collection in the dart testing system 20 begins when the dart is moved and ends when the dart comes to a stop at the top of its stroke. This ensures that delays and timing considerations do not impact the data collected while the dart is in contact with the film sample. Therefore, in order to isolate the relevant portions of data within the collected data, the collected data is preferably truncated. This is performed using the data from the impact sensor that indicates the time at which the dart makes contact with the film. Completion of puncture is indicated when the measured force falls to zero. However, due to filtering of the force signal, the force may not drop to zero. Therefore, in an embodiment, the puncture complete point is identified using the unfiltered force signal.

Figure 12A:
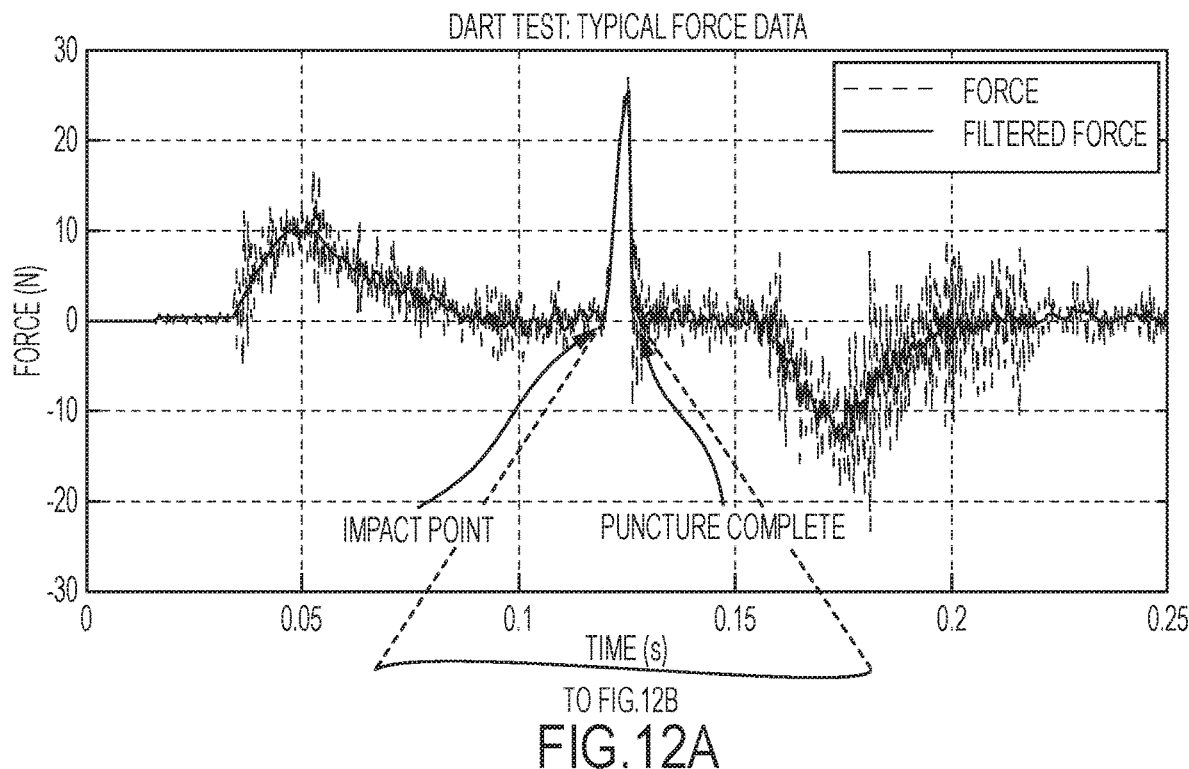
FIG. 12A is a plot of the force (N) exerted on the probe versus time (s) from a start of the movement of the probe to a complete stop of the probe, according to an embodiment.

FIG. 12A is a plot of the force (N) exerted on the probe versus time (s) from a start of the movement of the probe to a complete stop of the probe, according to an embodiment. This plot shows a first broad peak corresponding to the acceleration of the probe, a sharp peak corresponding to the contact of the probe with the film sample and a second broad peak corresponding to the deceleration of the probe.

Figure 12B:
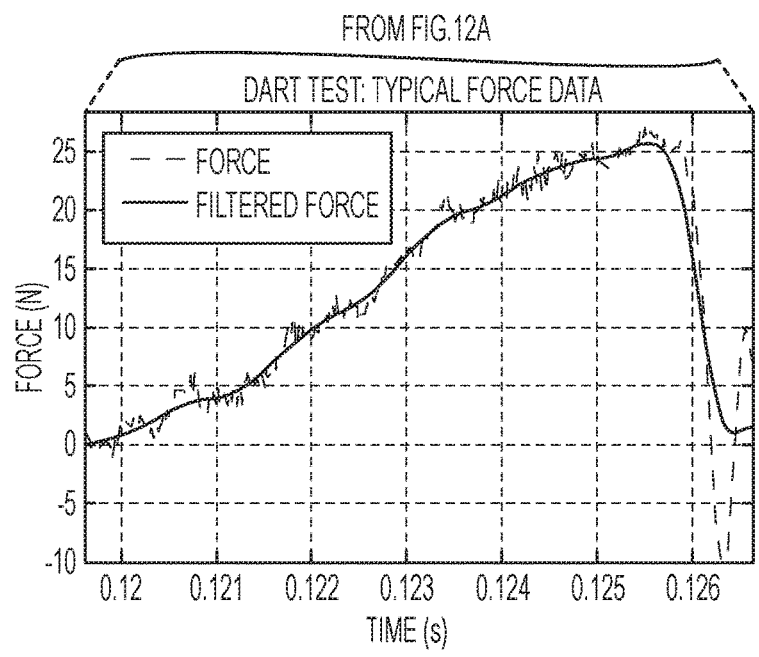
FIG. 12B is a plot of the force (N) exerted on the probe versus time (s) from the impact point with the film sample to completion of puncture of the film sample, according to an embodiment of the present disclosure.

FIG. 12B is a plot of the force (N) exerted on the probe versus time (s) from the impact point with the film sample to completion of puncture of the film sample, according to an embodiment of the present disclosure.

TABLE 2

| Metric | Units | Description | Calculation |
| --- | --- | --- | --- |
| Peak Force | N | Maximum force experienced by the film sample during the test. | Identifying the maximum value of force after impact of the dart probe with the film sample |
| Peak Displacement | mm | Displacement of the film sample when peak force is observed. | Subtracting the displacement the of the dart probe at the point of impact with the film sample |

TABLE 2-continued

| Metric | Units | Description | Calculation |
| --- | --- | --- | --- |
| | | | from the displacement of the dart at peak force. |
| Peak Energy | J | Energy absorbed by the film sample when peak force is observed | Area under the force-displacement curve up to the point of maximal force. |
| Total Displacement | mm | Displacement of the film sample at the point of complete puncture of the film | Point of complete puncture of the film sample is identified as the point when the force returns to zero after reaching its maximal value |
| Total Energy | J | Total energy absorbed by the film sample | Area under the complete force-displacement curve |

Scientists look for a few key metrics calculated from the force data collected by the dart system. These metrics help characterize the films based on their applications. These metrics are summarized in Table 2 along with their units, description and a brief description of how they are calculated.

Figure 13A:
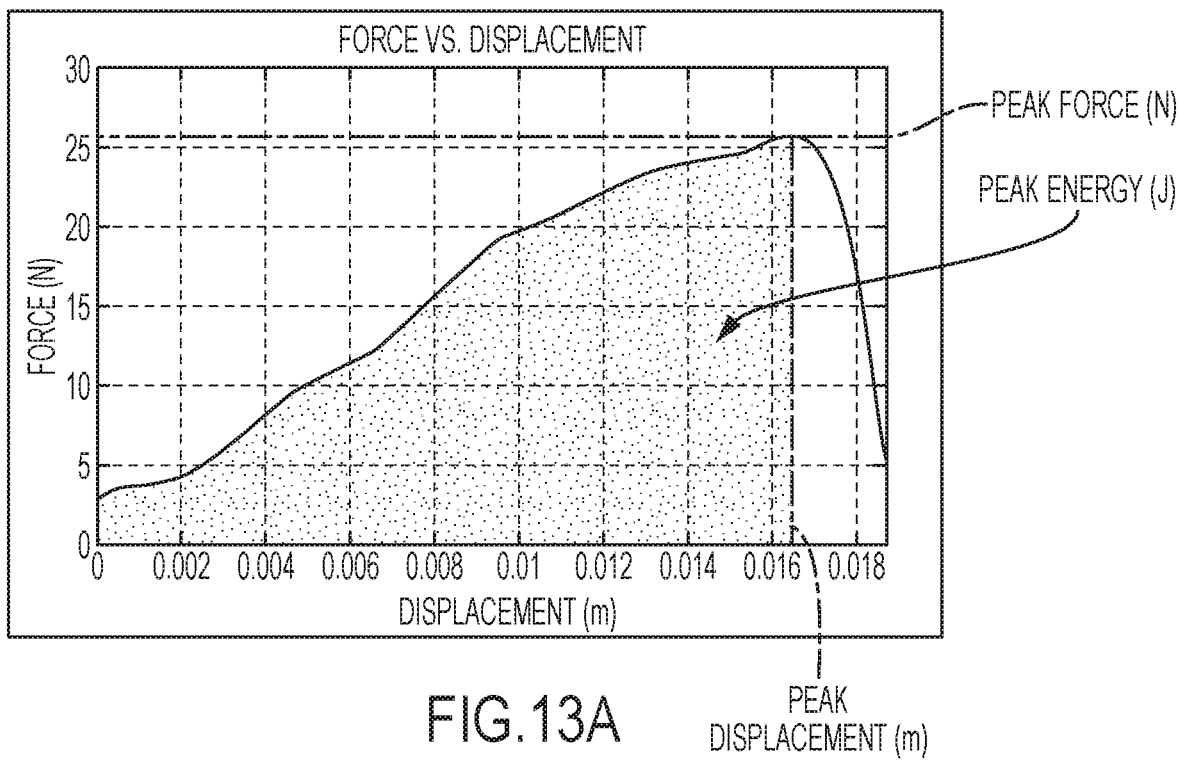
FIGS. 13A and 13B show plots of the force (N) versus displacement (m), according to an embodiment of the present disclosure.

FIG. 13A shows a plot of the force (N) versus displacement (m), according to an embodiment of the present disclosure. On FIG. 13A is indicated the peak of the force or maximum force and the peak energy corresponding to the area under the force curve up to the maximum force. The energy corresponds to the integral of the force to the distance or displacement. In an embodiment, a trapezoid method is used to compute the energy or integral of the force. However, as it can be appreciated other computing methods can be used.

Figure 13B:
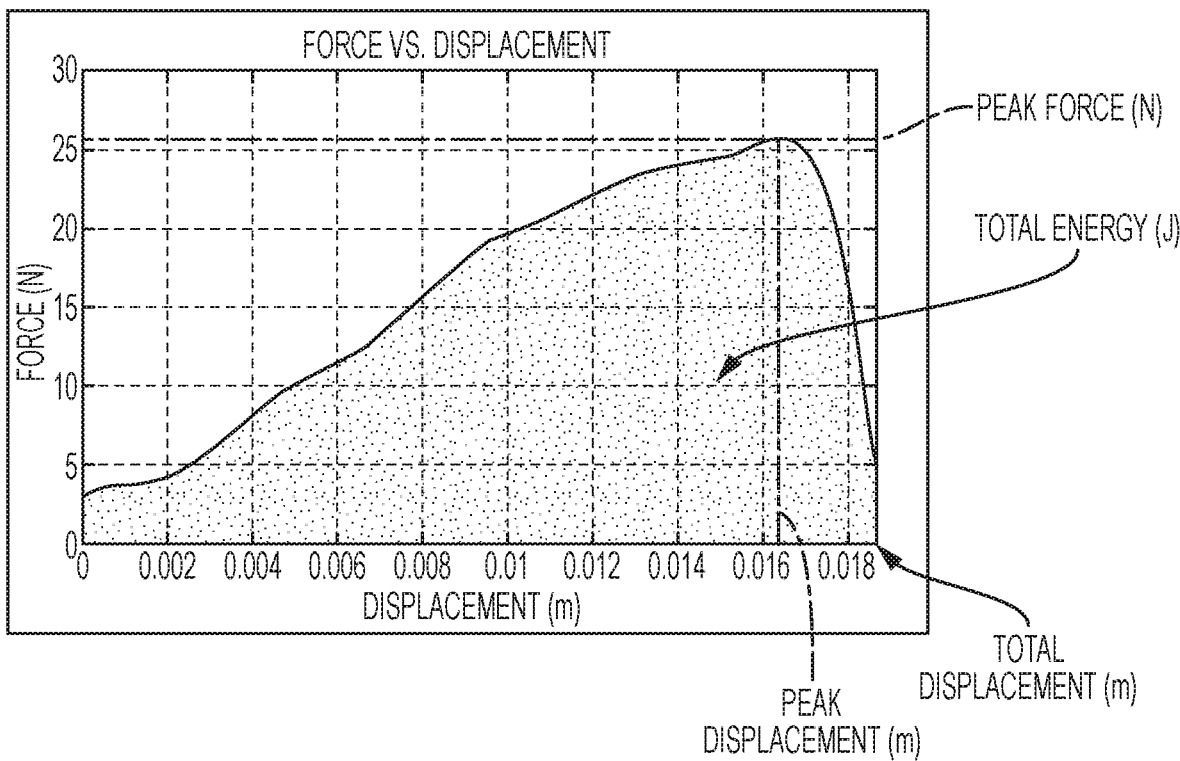

FIG. 13B shows a plot of the force (N) versus displacement (m), according to an embodiment of the present disclosure. On FIG. 13B is indicated the peak of the force or maximum force and the total energy corresponding to the area under the force curve up to the total displacement.

After all replicates or film samples of a single type of film have been tested, a statistical algorithm is used to detect and eliminate any outliers in the data. The purpose of eliminating any statistical outliers is to eliminate any incorrect test results that may result from improper testing (e.g., no film present during test, torn film, etc.). Hence, the thresholds used to eliminate outliers are conservative.

In an embodiment, once the outliers are identified, the mean and standard deviations of the remaining replicates or samples in the data set can be calculated and uploaded to a database. Outlier data can be tagged as such and can be stored in the database for further review if desired.

The term "computer system" is used herein to encompass any data processing system or processing unit or units. The computer system may include one or more processors or processing units. The computer system can also be a distributed computing system. The computer system may include, for example, a desktop computer, a laptop computer, a handheld computing device such as a PDA, a tablet, a smartphone, etc. A computer program product or products may be run on the computer system to accomplish the functions or operations described in the above paragraphs. The computer program product includes a computer readable medium or storage medium or media having instructions stored thereon used to program the computer system to perform the functions or operations described above. Examples of suitable storage medium or media include any type of disk including floppy disks, optical disks, DVDs, CD ROMs, magnetic optical disks, RAMs, EPROMs, EEPROMs, magnetic or optical cards, hard disk, flash card (e.g., a USB flash card), PCMCIA memory card, smart card, or other media. Alternatively, a portion or the whole computer program product can be downloaded from a remote computer or server via a network such as the internet, an ATM network, a wide area network (WAN) or a local area network.

Stored on one or more of the computer readable media, the program may include software for controlling a general purpose or specialized computer system or processor. The software also enables the computer system or processor to interact with a user via output devices such as a graphical user interface, head mounted display (HMD), etc. The software may also include, but is not limited to, device drivers, operating systems and user applications. Alternatively, instead or in addition to implementing the methods described above as computer program product(s) (e.g., as software products) embodied in a computer, the method described above can be implemented as hardware in which for example an application specific integrated circuit (ASIC) or graphics processing unit or units (GPU) can be designed to implement the method or methods, functions or operations of the present disclosure.

The invention claimed is:

1. A system for analyzing a physical characteristic of a film sample, the system comprising:
   a material holder system configured to hold the film sample;
   a dart testing system configured to test a physical characteristic of the film sample; and
   a moving system configured to move the held film sample to be analyzed or tested between stations,
   wherein the moving system is configured to move the held film sample in the material holder system to the dart testing system from a different station.

2. The system according to claim 1, wherein the moving system comprises an articulating-arm robotic system.

3. The system according to claim 1, wherein the material holder system includes a vacuum suction system configured to hold the film through vacuum suction, wherein the film sample has a quadrilateral shape with four corners and the vacuum suction system comprises a first pair of suction cups and a second pair of suction cups configured to hold the film sample substantially on each corner of the film sample.

4. The system according to claim 3, wherein the vacuum suction system comprises a first pair of suction cups and a second pair of suction cups configured to hold and place the film sample to be tested, and a third pair of suction cups configured to pick up a previously tested film sample.

5. The system according to claim 1, further comprising a material thickness measurement system configured to measure a thickness of the film sample.

6. The system according to claim 5, wherein the material thickness measurement system comprises a probe configured to measure a thickness of the film sample over a spread area to avoid puncturing the film sample during the measurement.

7. The system according to claim 1, wherein the dart testing system comprises a clamping system having an upper jaw and a lower jaw, wherein the upper jaw and the lower jaw each comprise grooves and ridges, and ridges in one of the upper and lower jaw are configured to fit into grooves of the other of the upper and lower jaw.

8. The system according to claim 7, wherein one of the upper jaw and the lower jaw comprises a holding mechanism configured to hold the film sample in place while the clamping system is open.

9. The system according to claim 1, wherein the dart testing system comprises a dart probe mechanism configured to test a physical characteristic of the film sample.

10. The system according to claim 9, wherein the dart probe mechanism comprises a dart probe and a propulsion system configured to move the dart probe.

11. The system according to claim 10, wherein the propulsion system comprises a linear motor.

12. The system according to claim 9, wherein the dart probe mechanism comprises a piezoelectric force sensor connected to the dart probe, the piezoelectric force sensor being configured to measure a force signal during a dart test of the film sample.

13. The system according to claim 1, further comprising a computer system in communication with the dart testing system, the computer system being configured to acquire force data from the dart testing system.

14. The system according to claim 1, further comprising a material image analyzer system configured to detect a defect in the film sample.

15. A method for analyzing a physical characteristic of a film sample, the method comprising:
holding the film sample by a material holder system connected to a moving system;
moving the film sample by the moving system to a dart testing system from a different station; and
testing a physical characteristic of the film of the material using the dart testing system.

16. The method according to claim 15, wherein testing the physical characteristic of the film sample comprises holding the film sample taut and unstressed during the testing using a clamping system of the dart testing system.

17. The method according to claim 15, wherein testing the physical characteristic of the film sample comprises puncturing the film sample with a dart probe of the dart testing system and measuring a force during testing of the film sample.

18. The method according to claim 15, further comprising:
moving the film sample by the moving system from the dart testing system to a material thickness measurement system; and
measuring a thickness of the film sample using the material thickness measurement system.

19. The method according to claim 15, further comprising:
moving the film sample by the moving system from the dart testing system to a material image analyzer system; and
detecting a defect in the film sample using the material image analyzer system.

20. A method for analyzing a physical characteristic of a film sample, the method comprising:
picking up the film sample by a robotic system connected to a moving system;
moving the film sample by the moving system to a dart testing system;
placing the film sample by the robotic system in a clamp of the dart testing system;
testing a physical characteristic of the film of the material using the dart testing system;
picking up the film sample by the robotic system from the clamp of the dart testing system; and
moving the film sample by the moving system from the dart testing system to another station.

* * * * *